(12) United States Patent
Shiroyama

(10) Patent No.: US 12,438,473 B2
(45) Date of Patent: Oct. 7, 2025

(54) CONTROL CIRCUIT AND POWER FACTOR CORRECTION CIRCUIT

(71) Applicant: FUJI ELECTRIC CO., LTD., Kawasaki (JP)

(72) Inventor: Hironobu Shiroyama, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 244 days.

(21) Appl. No.: 18/453,925

(22) Filed: Aug. 22, 2023

(65) Prior Publication Data

US 2024/0136940 A1 Apr. 25, 2024
US 2024/0235417 A9 Jul. 11, 2024

(30) Foreign Application Priority Data

Oct. 25, 2022 (JP) .................. 2022-170462

(51) Int. Cl.
*H02M 7/219* (2006.01)
*H02M 1/42* (2007.01)
*H02M 7/08* (2006.01)
*H02M 7/217* (2006.01)
*H02M 7/23* (2006.01)

(52) U.S. Cl.
CPC ....... *H02M 7/2195* (2021.05); *H02M 1/4208* (2013.01); *H02M 7/2176* (2013.01); *H02M 7/08* (2013.01); *H02M 7/23* (2013.01)

(58) Field of Classification Search
CPC ..... H02M 1/0038; H02M 1/4208; H02M 7/08
See application file for complete search history.

(56) References Cited

U.S. PATENT DOCUMENTS

| | | | |
|---|---|---|---|
| 10,720,829 B1* | 7/2020 | Huang | H02M 7/162 |
| 11,139,750 B2* | 10/2021 | Lai | H02M 7/219 |
| 2019/0319528 A1* | 10/2019 | Matsuura | H02M 1/083 |
| 2022/0224218 A1 | 7/2022 | Endo et al. | |

FOREIGN PATENT DOCUMENTS

| | | |
|---|---|---|
| JP | 2013-251951 A | 12/2013 |
| WO | 2021/210289 A1 | 10/2021 |

* cited by examiner

*Primary Examiner* — Jue Zhang
(74) *Attorney, Agent, or Firm* — Rabin & Berdo, P.C.

(57) ABSTRACT

A control circuit for a circuit that has a rectifier circuit including first to fourth diodes, and first to fourth switches respectively connected in parallel with the first to fourth diodes, for rectifying an AC voltage; and a capacitor receiving the rectified AC voltage. The control circuit controls the first to fourth switches, and includes: a determination unit determining an off-period in which, when the AC voltage is applied, the first to fourth diodes turn off, the off-period including a first period and a second period, in which the first and fourth diodes, and the second and third diodes, respectively turn off; and a control unit turning on the first and fourth switches in the first period, when the second and third diodes are off, and turning on the second and third switches in the second period, when the first and fourth diodes are off.

10 Claims, 24 Drawing Sheets

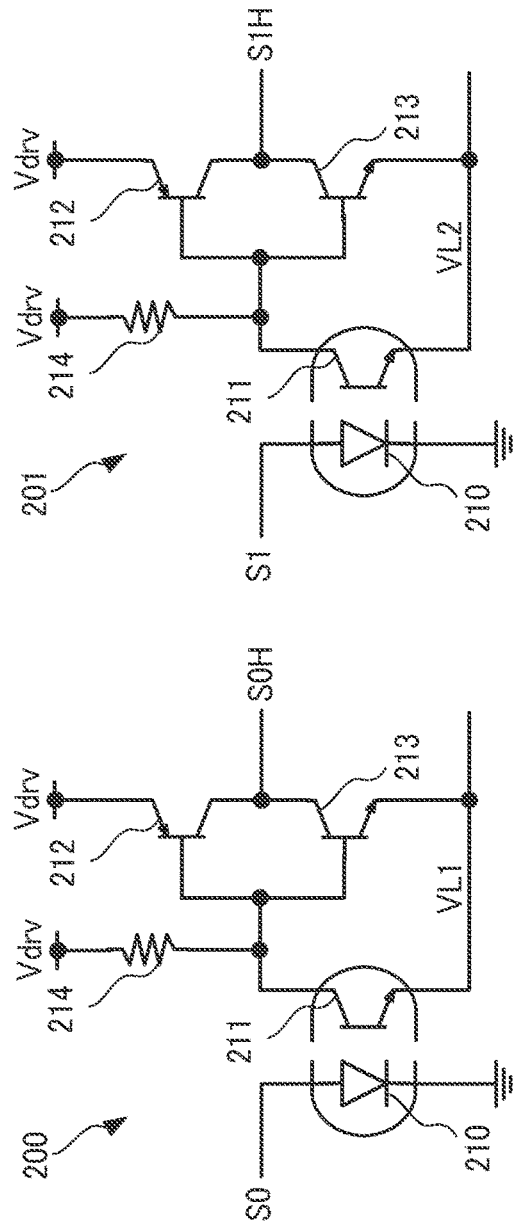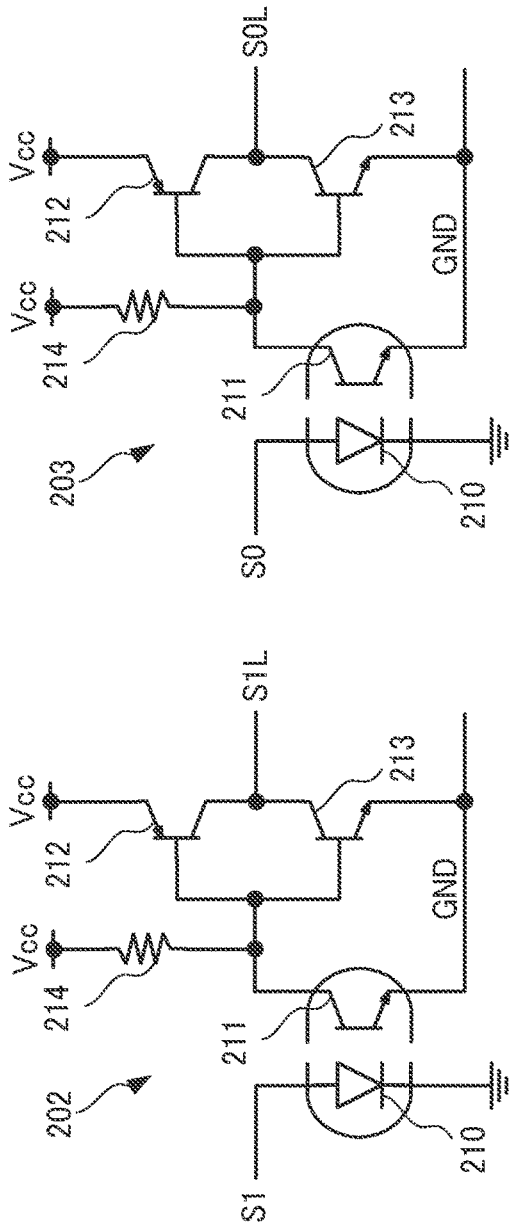

US 12,438,473 B2

CONTROL CIRCUIT AND POWER FACTOR CORRECTION CIRCUIT

CROSS-REFERENCE TO RELATED APPLICATION

The present application claims priority pursuant to 35 U.S.C. § 119 from Japanese patent application number 2022-170462 filed on Oct. 25, 2022, the entire disclosure of which is hereby incorporated by reference herein.

BACKGROUND

Technical Field

The present disclosure relates to a control circuit and a circuit.

Description of the Related Art

In general, an alternating current (AC)-direct current (DC) converter using a full-wave rectifier circuit, a smoothing capacitor, and a power factor correction circuit is known. In such an AC-DC converter, a diode constituting the full-wave rectifier circuit may turn off due to a relationship between an AC voltage and a voltage of the smoothing capacitor.

As a result, the AC current of the AC-DC converter does not flow, and distortion occurs in the AC current (for example, Japanese Patent Application Publication No. 2013-251951A and WO2021/210289).

SUMMARY

A first aspect of the present disclosure is a control circuit for a circuit that includes: a first line and a second line having an alternating current (AC) voltage applied thereto; a first full-wave rectifier circuit including: a first diode configured to cause a first current to flow from the first line, a second diode configured to cause a second current to flow from the second line, a third diode configured to cause a third current to flow to the first line, a fourth diode configured to cause a fourth current to flow to the second line, and a first switch to a fourth switch respectively connected in parallel with the first diode to the fourth diode, and being configured to rectify the AC voltage, to thereby obtain a first rectified voltage; and a capacitor to which the first rectified voltage is applied, the control circuit being configured to control the first to fourth switches, and comprising: a determination unit configured to determine an off period in which, in a state where the AC voltage is applied to the first line and the second line, the first diode, the second diode, the third diode, and the fourth diode turn off, the off period including a first period in which the first diode and the fourth diode turn off when the second diode and the third diode are off, and a second period in which the second diode and the third diode turn off when the first diode and the fourth diode are off; and a control unit configured to turn on the first switch and the fourth switch in the first period, turn on the second switch and the third switch in the second period.

A second aspect of the present disclosure is a control circuit for a circuit that includes: a first line and a second line having an alternating current (AC) voltage applied thereto; a first full-wave rectifier circuit, including: a first diode configured to cause a first current to flow from the first line, a second diode configured to cause a second current to flow from the second line, a third diode configured to cause a third current to flow to the first line, a fourth diode configured to cause a fourth current to flow to the second line, and a first switch to a fourth switch respectively connected in parallel with the first diode to the fourth diode, and being configured to rectify the AC voltage, to thereby obtain a first rectified voltage; and a capacitor to which the first rectified voltage is applied, the circuit having a load that operates based on the AC voltage, the control circuit being configured to control the first to fourth switches, and comprising: a calculation unit configured to calculate, based on an effective value of the AC voltage, a frequency of the AC voltage, power consumption of the load operating based on the AC voltage, and a capacitance value of the capacitor, a predetermined period in which, in a state where the AC voltage is applied to the first line and the second line, the first diode, the second diode, the third diode, and the fourth diode turn off, the predetermined period including a first period in which the first diode and the fourth diode turn off when the second diode and the third diode are off, and a second period in which the second diode and the third diode turn off when the first diode and the fourth diode are off; and a control unit configured to turn on the first switch and the fourth switch in the first period of the predetermined period after a current flowing through the first line and the second line is zero, and turn on the second switch and the third switch in the second period of the predetermined period after the current flowing through the first line and the second line is zero.

A third aspect of an embodiment of the present disclosure is a circuit, comprising: a first line and a second line having an alternating current (AC) voltage applied thereto; a first full-wave rectifier circuit, including: a first diode configured to cause a first current to flow from the first line, a second diode configured to cause a second current to flow from the second line, a third diode configured to cause a third current to flow to the first line, a fourth diode configured to cause a fourth current to flow to the second line, and a first switch to a fourth switch respectively connected in parallel with the first diode to the fourth diode, and being configured to rectify the AC voltage, to thereby obtain a first rectified voltage; a capacitor to which the first rectified voltage is applied; and a control circuit configured to control the first switch to the fourth switch, wherein the control circuit includes a determination unit configured to determine an off period in which, in a state where the AC voltage is applied to the first line and the second line, the first diode, the second diode, the third diode, and the fourth diode turn off, the off period including a first period in which the first diode and the fourth diode turn off when the second diode and the third diode are off, and a second period in which the second diode and the third diode turn off when the first diode and the fourth diode are off; and a control unit configured to turn on the first switch and the fourth switch in the first period, and turn on the second switch and the third switch in the second period.

A forth aspect of the present disclosure is a control circuit for a circuit that includes: a first line and a second line having an alternating current (AC) voltage applied thereto; a first full-wave rectifier circuit including: a first diode configured to cause a first current to flow from the first line, a second diode configured to cause a second current to flow from the second line, a third diode configured to cause a third current to flow to the first line, a fourth diode configured to cause a fourth current to flow to the second line, and a first switch to a fourth switch respectively connected in parallel with the first diode to the fourth diode, and being configured to rectify the AC voltage, to thereby obtain a first rectified voltage; and a capacitor to which the first rectified voltage is applied, the control circuit being configured to control the first to fourth switches, and comprising: a first determination circuit configured to determine a direction in which a current flows through the first line; a second determination circuit configured to determine whether a voltage of the first line is higher than a voltage of the second line; and an on circuit configured to turn on the first switch and the fourth switch when the current flows from the second line to the first full-wave rectifier circuit and the voltage of the first line is higher than the voltage of the second line, and turn on the second switch and the third switch when the current flows from the first line to the first full-wave rectifier circuit and the voltage of the first line is lower than the voltage of the second line.

A fifth aspect of the present disclosure is a circuit comprising: a first line and a second line having an alternating current (AC) voltage applied thereto; a first full-wave rectifier circuit, including: a first diode configured to cause a first current to flow from the first line, a second diode configured to cause a second current to flow from the second line, a third diode configured to cause a third current to flow to the first line, a fourth diode configured to cause a fourth current to flow to the second line, and a first switch to a fourth switch respectively connected in parallel with the first diode to the fourth diode, and being configured to rectify the AC voltage, to thereby obtain a first rectified voltage; a capacitor to which the first rectified voltage is applied; and a control circuit configured to control the first switch to the fourth switch, wherein the control circuit includes a first determination circuit configured to determine a direction in which a current flows through the first line, a second determination circuit configured to determine whether a voltage of the first line is higher than a voltage of the second line, and an on circuit configured to turn on the first switch and the fourth switch when the current flows from the second line to the first full-wave rectifier circuit and the voltage of the first line is higher than the voltage of the second line, and turn on the second switch and the third switch when the current flows from the first line to the first full-wave rectifier circuit and the voltage of the first line is lower than the voltage of the second line.

BRIEF DESCRIPTION OF THE DRAWINGS

FIG. 1 is a diagram illustrating one example of an AC-DC converter 10a.

FIG. 2 is a diagram illustrating one example of a full-wave rectifier circuit 20a and a control block 23a.

FIG. 3 is a diagram illustrating one example of a control circuit 100a.

FIGS. 4A to 4D are diagrams illustrating one example of driver circuits 200 to 203.

FIG. 5 is a diagram illustrating a main waveform of the control block 23a.

DETAILED DESCRIPTION

At least the following matters are made clear from the following description and the accompanying drawings. Note that, hereinafter, a "circuit" in the present embodiment not only includes an analog circuit and a wired logic-type logic circuit, but also includes a functional block (or means) that is included in a digital signal processor (DSP), a microcomputer, and the like, and can perform digital arithmetic processing.

Hereinafter, the same configuration will be provided with the same reference sign, and description of the same configuration will be omitted.

Present Embodiment

Figure 1:
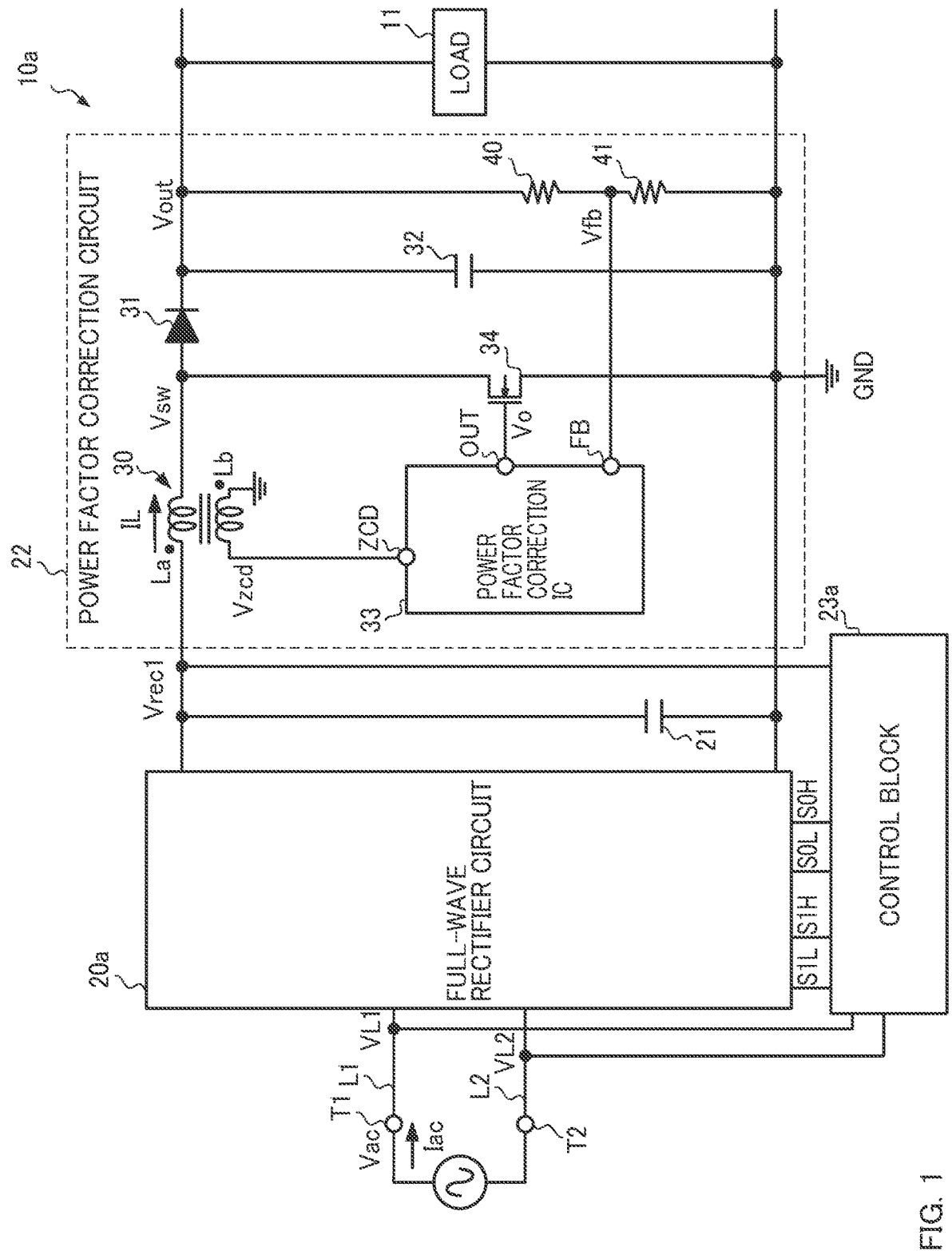

Overview of AC-DC Converter 10a:

FIG. 1 is a diagram illustrating a configuration of an AC-DC converter 10a according to one embodiment of the present invention. The AC-DC converter 10a generates an output voltage Vout at a target level from an AC voltage Vac of a commercial power supply applied between terminals T1 and T2, and power is supplied to a load 11. Note that a line connected to the terminal T1 is a line L1, and a line connected to the terminal T2 is a line L2. The line L1 corresponds to a "first line", and the line L2 corresponds to a "second line".

The AC-DC converter 10a includes a full-wave rectifier circuit 20a, a capacitor 21, a power factor correction circuit 22, and a control block 23a. Although details will be described below, the full-wave rectifier circuit 20a performs full-wave rectification on the predetermined AC voltage Vac applied between the lines L1 and L2, and outputs a rectified voltage Vrec1 to the capacitor 21 and a main coil La (described below) of a transformer 30. Note that the AC voltage Vac is, for example, a voltage having an effective value of 100 to 240 V and a frequency of 50 to 60 Hz. Note that, hereinafter, in the present embodiment, a voltage is basically a potential difference from a reference point (GND in the diagram), and the AC voltage Vac indicates a voltage between terminals. Note that, hereinafter, a potential of GND in the diagram is appropriately referred to as a "ground potential".

In the present embodiment, when the AC voltage Vac is 0 V (i.e., when a potential difference between the lines L1 and L2 is zero), various circuits such as the full-wave rectifier circuit 20a described below are connected to the lines L1 and L2 such that both of the potentials of the lines L1 and L2 are the ground potential (0 V). Therefore, in the present embodiment, when a voltage VL1 of the line L1 and a voltage VL2 of the line L2 are equal to each other, the AC voltage Vac is 0 V. Furthermore, in the present embodiment, when the voltage VL1 of the line L1 is higher than the voltage VL2 of the line L2, a level of the AC voltage Vac is positive (>0), and when the voltage VL1 of the line L1 is lower than the voltage VL2 of the line L2, a level of the AC voltage Vac is negative (<0).

A current flowing from the commercial power supply through the lines L1 and L2 is an AC current Iac, and when the AC current Iac flows in a direction of an arrow illustrated in FIG. 1 (direction from the terminal T1 to the full-wave rectifier circuit 20a described below), the AC current Iac is assumed to be a positive current. On the other hand, when the AC current Iac flows in a direction opposite to the direction of the arrow illustrated in FIG. 1, the AC current Iac is assumed to be a negative current.

Although details of the full-wave rectifier circuit 20a will be described below, the full-wave rectifier circuit 20a corresponds to a "first full-wave rectifier circuit".

The capacitor 21 receives application of the rectified voltage Vrec1 and smooths the rectified voltage Vrec1. Note that the rectified voltage Vrec1 corresponds to a "first rectified voltage".

The power factor correction circuit 22 includes the transformer 30, a diode 31, a capacitor 32, a power factor correction IC 33, an NMOS transistor 34, and resistors 40 and 41. The main coil La of the transformer 30, the diode 31, the capacitor 32, and the NMOS transistor 34 constitute a booster chopper circuit. Thus, a charging voltage of the capacitor 32 is a DC output voltage Vout.

The transformer 30 includes the main coil La, and an auxiliary coil Lb magnetically coupled to the main coil La. Here, in the present embodiment, the auxiliary coil Lb is wound such that a voltage generated in the auxiliary coil Lb has polarity opposite to that of a voltage generated in the main coil La. Then, a voltage Vzcd generated in the auxiliary coil Lb is applied to a terminal ZCD of the power factor correction IC 33 (described below).

The power factor correction IC 33 is an integrated circuit configured to control switching of the NMOS transistor 34 such that a level of the output voltage Vout is a target level (for example, 400 V) while improving an input power factor of the AC-DC converter 10a. Specifically, the power factor correction IC 33 drives the NMOS transistor 34, based on an inductor current IL flowing through the main coil La and the output voltage Vout. Note that the power factor correction IC 33 is provided with the terminal ZCD and terminals FB and OUT.

The NMOS transistor 34 is a power transistor for controlling power to the load 11 of the AC-DC converter 10a. Note that, in the present embodiment, the NMOS transistor 34 is an N-type metal oxide semiconductor (MOS) transistor, but the present embodiment is not limited to this. The NMOS transistor 34 may be, for example, another switching element such as an insulated gate bipolar transistor (IGBT) and a bipolar transistor. A gate electrode of the NMOS transistor 34 is connected to the terminal OUT.

The resistors 40 and 41 constitute a voltage divider circuit configured to divide the output voltage Vout, and generates a feedback voltage Vfb used for switching the NMOS transistor 34. Note that the feedback voltage Vfb generated at a node connected to the resistors 40 and 41 is applied to the terminal FB.

Brief Description of Operation of Power Factor Correction Circuit 22:

The power factor correction circuit 22 operates so as to match a phase of the AC voltage Vac with a phase of the AC current Iac to improve a power factor. In the power factor correction circuit 22, the power factor correction IC 33 controls switching of the NMOS transistor 34 configured to cause the inductor current IL to flow through the main coil La, based on the feedback voltage Vfb and the inductor current IL.

Specifically, the power factor correction IC 33 turns on the NMOS transistor 34 when the inductor current IL is zero, and turns off the NMOS transistor 34 when a period depending on the feedback voltage Vfb elapses. In this way, the inductor current IL has a current value changing between zero and a peak current depending on the rectified voltage Vrec1. As a result, by averaging the inductor current IL, a phase of the AC voltage Vac matches with a phase of an average current (i.e., the AC current Iac) of the inductor current IL. Note that further details of the power factor correction circuit 22 will be omitted.

Although details will be described below, the control block 23a controls the full-wave rectifier circuit 20a, based on the AC voltage Vac and the voltage Vrec1 of the capacitor 21.

Figure 2:
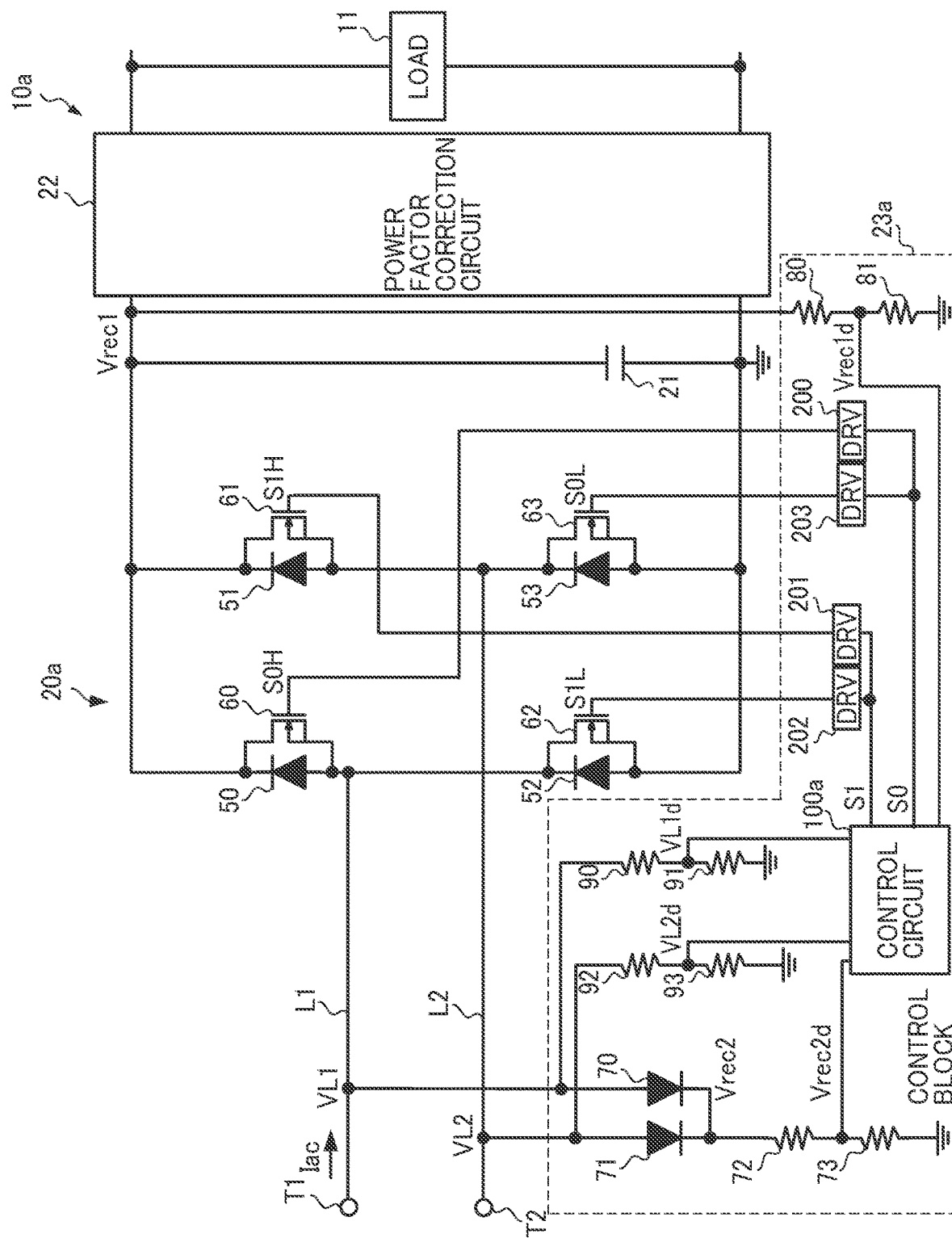

With Regard to Full-Wave Rectifier Circuit 20a and Control Block 23a:
Configuration of Full-Wave Rectifier Circuit 20a:

FIG. 2 is a diagram illustrating one example of the full-wave rectifier circuit 20a and the control block 23a. The full-wave rectifier circuit 20a performs full-wave rectification on the AC voltage Vac to generate the rectified voltage Vrec1. The full-wave rectifier circuit 20a includes diodes 50 to 53 and NMOS transistors 60 to 63. The diodes 50 to 53 constitute a diode bridge. Specifically, the diode 50 has an anode connected to the line L1 and a cathode connected to the capacitor 21, and causes the AC current Iac from the line L1 to flow through the capacitor 21. The diode 51 has an anode connected to the line L2 and a cathode connected to the capacitor 21, and causes the AC current Iac from the line L2 to flow through the capacitor 21.

The diode 52 has an anode connected to the ground and a cathode connected to the line L1, and causes the AC current Iac to flow from the ground to the line L1. The diode 53 has an anode connected to the ground and a cathode connected to the line L2, and causes the AC current Iac to flow from the ground to the line L2.

Although details will be described below, when a level of the AC voltage Vac is positive, the diodes 50 and 53 turn on and the AC current Iac flows in the positive direction. At this time, when potentials of the line L1 and the line L2 are considered with reference to the rectified ground voltage GND, the potential of the line L1 is a positive potential and the potential of the line L2 is substantially zero. Note that, here, the diode 50 does not turn on unless the voltage VL1 of the line L1 is higher than the voltage Vrec1 of the capacitor 21 by a forward voltage of the diode 50. The diode 53 does not turn on unless the voltage VL2 of the line L2 is lower than the ground voltage by a forward voltage of the diode 53.

When a level of the AC voltage Vac is negative, the diodes 51 and 52 turn on and the AC current Iac flows in the negative direction. At this time, when potentials of the line L1 and the line L2 are considered with reference to the rectified ground voltage GND, the potential of the line L1 is substantially zero and the potential of the line L2 is a positive potential. Note that, here, the diode 51 does not turn on unless the voltage VL2 of the line L2 is higher than the voltage Vrec1 of the capacitor 21 by a forward voltage of the diode 51. The diode 52 does not turn on unless the voltage VL1 of the line L1 is lower than the ground voltage by a forward voltage of the diode 52.

The NMOS transistors 60 to 63 are elements for continuously causing the AC current Iac to flow in order to suppress distortion of the AC current Iac, and are connected in parallel with the diodes 50 to 53, respectively.

For example, the NMOS transistor 60 is connected in parallel with the diode 50. The NMOS transistor 60 turns on in a period in which the diode 50 is off regardless of the voltage VL1 of the line L1 being a positive voltage. As a result, the AC current Iac flows from the capacitor 21 to the line L1, and thus the AC current Iac can be continuously changed.

The diodes 50 and 51 have a cathode connected to a high potential side of the capacitor 21, and are thus referred to as high potential-side diodes. The diodes 52 and 53 have an anode connected to low potential side of the capacitor 21, and are thus referred to as low potential-side diodes. Note that the diodes 50 to 53 correspond to "first to fourth diodes", and the NMOS transistors 60 to 63 correspond to "first to fourth switches".

Configuration of Control Block 23a:

The control block 23a is a block configured to control switching of the NMOS transistors 60 to 63 in order to suppress distortion of the AC current Iac. Specifically, the control block 23a turns on the NMOS transistors 60 and 63 in a period PA in which the diodes 50 and 53 turn off in a state where a level of the AC voltage Vac is positive and the voltage VL1 of the line L1 is the positive voltage. The control block 23a turns on the NMOS transistors 61 and 62 in a period PB in which the diodes 51 and 52 turn off in a state where a level of the AC voltage Vac is negative and the voltage VL2 of the line L2 is the positive voltage. In this way, even in the state where the diodes 50 to 53 are off, the AC current Iac can be continuously changed, and thus distortion of the AC current Iac can be suppressed. Note that the period PA corresponds to a "first period", and the period PB corresponds to a "second period".

The control block 23a includes diodes 70 and 71, resistors 72, 73, 80, 81, and 90 to 93, a control circuit 100a, and driver circuits 200 to 203.

The diodes 70 and 71 constitute a full-wave rectifier circuit. The diode 70 has an anode connected to the line L1 and a cathode connected to a cathode of the diode 71. The diode 71 has an anode connected to the line L2 and a cathode connected to one end of the resistor 72. A rectified voltage Vrec2 acquired by performing full-wave rectification on the AC voltage Vac is generated at the cathodes of the diodes 70 and 71. Note that the diodes 70 and 71 correspond to a "second full-wave rectifier circuit", and the rectified voltage Vrec2 corresponds to a "second rectified voltage".

The resistors 72 and 73 constitute a voltage divider circuit configured to divide the rectified voltage Vrec2, the other end of the resistor 72 is connected to one end of the resistor 73, and the other end of the resistor 73 is grounded. A voltage Vrec2d acquired by dividing the rectified voltage Vrec2 is generated at a connection point between the resistor 72 and the resistor 73. Note that the resistors 72 and 73 correspond to a "first voltage divider circuit", and the voltage Vrec2d corresponds to a "first divided voltage".

The resistors 80 and 81 constitute a voltage divider circuit configured to divide the rectified voltage Vrec1 applied to the capacitor 21, the rectified voltage Vrec1 is applied to one end of the resistor 80, the other end of the resistor 80 is connected to one end of the resistor 81, and the other end of the resistor 81 is grounded. A voltage Vrec1d acquired by dividing the rectified voltage Vrec1 is generated at a connection point between the resistor 80 and the resistor 81. In the present embodiment, a voltage division ratio by the resistors 72 and 73 is set to be the same as a voltage division rate by the resistors 80 and 81 such that the voltage Vrec1 and the voltage Vrec2 can be accurately compared.

Then, in the present embodiment, by comparing the voltage Vrec1d and the voltage Vrec2d, whether the voltage VL1 of the line L1 is higher than the voltage Vrec1 of the capacitor 21 by the forward voltage of the diode 50 can be detected. In this way, when the voltage VL1 of the line L1 is the positive voltage, whether the diode 50 is on or off can be detected.

Similarly, by comparing the voltage Vrec1d and the voltage Vrec2d, whether the voltage VL2 of the line L2 is higher than the voltage Vrec1 of the capacitor 21 by the forward voltage of the diode 51 can be detected. In this way, when the voltage VL2 of the line L2 is the positive voltage, whether the diode 51 is on or off can be detected.

Although details will be described below, the diode 52 turns on or off according to on or off of the diode 51. Similarly, the diode 53 turns on or off according to on or off of the diode 50. Note that the resistors 80 and 81 correspond to a "second voltage divider circuit", and the voltage Vrec1d corresponds to a "second divided voltage".

The resistors 90 and 91 constitute a voltage divider circuit configured to generate a voltage VL1d for the control circuit 100a described below to detect whether the voltage VL1 of the line L1 is the positive voltage.

One end of the resistor 90 is connected to the line L1, the other end of the resistor 90 and one end of the resistor 91 are connected to each other, and the other end of the resistor 91 is grounded. The voltage VL1d acquired by dividing the voltage VL1 of the line L1 is generated at a connection point between the resistor 90 and the resistor 91.

The resistors 92 and 93 constitute a voltage divider circuit configured to generate a voltage VL2d for the control circuit 100a to detect whether the voltage VL2 of the line L2 is the positive voltage.

One end of the resistor 92 is connected to the line L2, the other end of the resistor 92 and one end of the resistor 93 are connected to each other, and the other end of the resistor 93 is grounded. The voltage VL2d acquired by dividing the voltage VL2 of the line L2 is generated at a connection point between the resistor 92 and the resistor 93.

Figure 3:
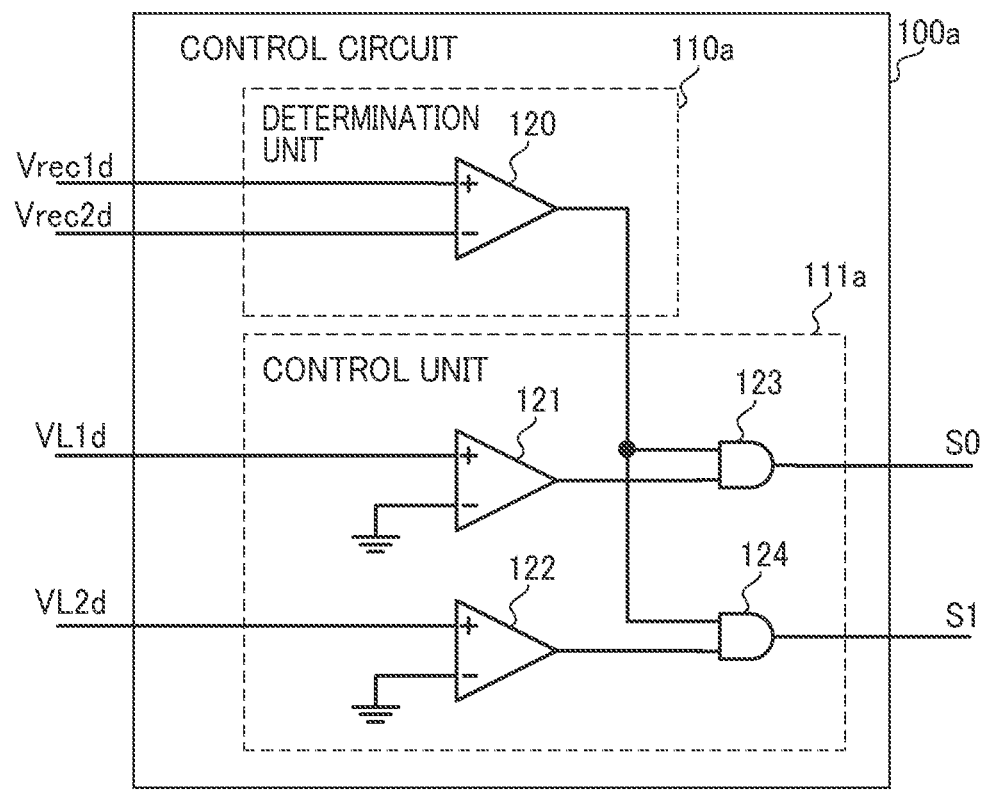

Configuration of Control Circuit 100a:

FIG. 3 is a diagram illustrating one example of the control circuit 100a. The control circuit 100a outputs, based on the voltages Vrec1d and Vrec2d and the voltages VL1d and VL2d, a signal S0 for turning on the NMOS transistors 60 and 63 in the period PA in which the diodes 50 and 53 turn off, and a signal S1 for turning on the NMOS transistors 61 and 62 in the period PB in which the diodes 51 and 52 turn off.

Although details will be described below, the control circuit 100a according to the present embodiment determines an off period P in which the diodes 50 to 53 turn off, based on the AC voltage Vac and a voltage of the capacitor 21. Then, in the off period P, the control circuit 100a turns on the NMOS transistors 60 and 63 in the period PA in a state where the diodes 51 and 52 are off, and turns on the NMOS transistors 61 and 62 in the period PB in a state where the diodes 50 and 53 are off.

Note that the state where the diodes 51 and 52 are off corresponds to a "first state", and the state where the diodes 50 and 53 are off corresponds to a "second state".

The control circuit 100a includes a determination unit 110a and a control unit 111a. The determination unit 110a is a comparison circuit 120 configured to compare the voltage Vrec1d and the voltage Vrec2d, and determines the off period P, based on the AC voltage Vac and a voltage of the capacitor 21.

As described above, when the voltage VL1 of the line L1 is the positive voltage and the voltage Vrec1d is higher than the voltage Vrec2d, the diode 50 turns off and the diode 53 also similarly turns off. When the voltage VL2 of the line L2 is the positive voltage and the voltage Vrec1d is higher than the voltage Vrec2d, the diode 51 turns off and the diode 52 also similarly turns off.

When the voltage Vrec1d is higher than the voltage Vrec2d, the comparison circuit 120 outputs a signal at a high level (hereinafter referred to as an "H" level") indicating the off period P in order to turn on either the NMOS transistors 60 and 63 or the NMOS transistors 61 and 62. On the other hand, when the voltage Vrec1d is lower than the voltage Vrec2d, the comparison circuit 120 outputs a signal at a low level (hereinafter referred to as an "L" level").

The control unit 11a turns on the NMOS transistors 60 and 63 in the period PA, and turns on the NMOS transistors 61 and 62 in the period PB. Specifically, the control unit 111a outputs the signal S0 for turning on and off the NMOS transistors 60 and 63 and the signal S1 for turning on and off the NMOS transistors 61 and 62, based on a relationship between the voltage VL1 of the line L1 and the voltage VL2 of the line L2, and the signal indicating the period P from the comparison circuit 120.

The control unit 111a includes comparison circuits 121 and 122 and AND circuits 123 and 124. In the present embodiment, when a level of the AC voltage Vac is positive and the voltage VL1 of the line L1 is the positive voltage, the voltage VL1d is higher than the ground voltage and the voltage VL2d is lower than the ground voltage.

On the other hand, when a level of the AC voltage Vac is negative and the voltage VL2 of the line L2 is the positive voltage, the voltage VL1d is lower than the ground voltage and the voltage VL2d is higher than the ground voltage. Therefore, the comparison circuit 121 compares the voltage VL1d and the ground voltage, and detects whether the voltage VL1 of the line L1 is the positive voltage. Similarly, the comparison circuit 122 compares the voltage VL2d and the ground voltage, and detects whether the voltage VL2 of the line L2 is the positive voltage.

Here, each of the voltages VL1d and VL2d and the ground voltage are compared, but a voltage with which the voltages VL1d and Vl2d are compared may be substantially the ground voltage, and may be appropriately at a predetermined level slightly higher than that of the ground voltage. Note that the comparison circuit 121 corresponds to a "first detection circuit", and the comparison circuit 122 corresponds to a "second detection circuit".

When the voltage VL1 of the line L1 is higher than the voltage VL2 of the line L2, the AND circuit 123 outputs a signal for turning on the NMOS transistors 60 and 63 in the period P. On the other hand, when the voltage VL1 of the line L1 is lower than the voltage VL2 of the line L2 or when it is not the period P, the AND circuit 123 outputs a signal for turning off the transistors 60 and 63. The AND circuit 123 computes a logical product of the signal from the comparison circuit 120 and the signal from the comparison circuit 121, and outputs the signal for turning on and off the NMOS transistors 60 and 63.

When the voltage VL2 of the line L2 is higher than the voltage VL1 of the line L1, the AND circuit 124 outputs a signal for turning on the NMOS transistors 61 and 62 in the period P. On the other hand, when the voltage VL2 of the line L2 is lower than the voltage VL1 of the line L1 or when it is not the period P, the AND circuit 124 outputs a signal for turning off the NMOS transistors 61 and 62. The AND circuit 124 computes a logical product of the signal from the comparison circuit 120 and the signal from the comparison circuit 122, and outputs the signal for turning on and off the NMOS transistors 61 and 62. Note that the AND circuits 123 and 124 correspond to a "switch control circuit". A circuit including the driver circuits 200 to 203 in the control unit 111a corresponds to a "control unit".

One Example of Driver Circuits 200 to 203:

FIGS. 4A to 4D are diagrams illustrating one example of the driver circuits (DRVs) 200 to 203 in FIG. 2. The driver circuits 200 to 203 respectively turn on and off the NMOS transistors 60 to 63, based on the signal S0 or S1. Specifically, the driver circuit 200 illustrated in FIG. 4A outputs a signal S0H of a voltage Vdrv for turning on the NMOS transistor 60, based on the signal S0 at the "H" level. On the other hand, the driver circuit 200 outputs the signal S0H of the voltage VL1 for turning off the NMOS transistor 60, based on the signal S0 at the "L" level.

The driver circuit 201 illustrated in FIG. 4B outputs a signal S1H of the voltage Vdrv for turning on the NMOS transistor 61, based on the signal S1 at the "H" level. On the other hand, the driver circuit 201 outputs the signal S1H of the voltage VL2 for turning off the NMOS transistor 61, based on the signal S1 at the "L" level.

The driver circuit 202 illustrated in FIG. 4C outputs a signal S1L of a voltage Vcc for turning on the NMOS transistor 62, based on the signal S1 at the "H" level. On the other hand, the driver circuit 202 outputs the signal S1L of the ground voltage GND for turning off the NMOS transistor 62, based on the signal S1 at the "L" level.

The driver circuit 203 illustrated in FIG. 4D outputs a signal S0L of the voltage Vcc for turning on the NMOS transistor 63, based on the signal S0 at the "H" level. On the other hand, the driver circuit 203 outputs the signal S0L of the ground voltage GND for turning off the NMOS transistor 63, based on the signal S0 at the "L" level. Note that the voltage Vdrv is a power supply voltage of the driver circuits 200 and 201, and the voltage Vcc is a power supply voltage from a regulator that is not illustrated.

The driver circuits 200 to 203 include a light emitting diode 210, a phototransistor 211, a PNP transistor 212, an NPN transistor 213, and a resistor 214. The light emitting diode 210 emits light depending on a logical level of the signal S0 or S1. Specifically, the light emitting diode 210 has an anode to which a voltage depending on the signal S0 or S1 is applied, and has a cathode grounded. The light emitting diode 210 turns on and emits light when a voltage depending on the signal S0 or S1 at the "H" level is applied. On the other hand, the light emitting diode 210 turns off and does not emit light when a voltage depending on the signal S0 or S1 at the "L" level is applied.

The phototransistor 211 controls, together with the resistor 214, a current flowing through a base of the PNP transistor 212 and the NPN transistor 213, based on light from the light emitting diode 210. Specifically, when the light emitting diode 210 emits light, the phototransistor 211 grounds the base, causes a current to flow between an emitter and the base of the PNP transistor 212, and turns on the PNP transistor 212. On the other hand, since the base is grounded by the phototransistor 211, a current does not flow between the base and an emitter of the NPN transistor 213, and the NPN transistor 213 turns off. As a result, as described above, the driver circuits 200 to 203 output the signal of the power supply voltage Vdrv or Vcc.

On the other hand, when the light emitting diode 210 does not emit light, the base is pulled up by the resistor 214, and thus the phototransistor 211 causes a current to flow between the base and the emitter of the NPN transistor 213, and turns on the NPN transistor 213. On the other hand, since the base is pulled up by the resistor 214, a current does not flow between the emitter and the base of the PNP transistor 212, and the PNP transistor 212 turns off. As a result, as described above, the driver circuits 200 to 203 output the signal of the voltages VL1 and VL2 or the ground voltage GND.

Figure 5:
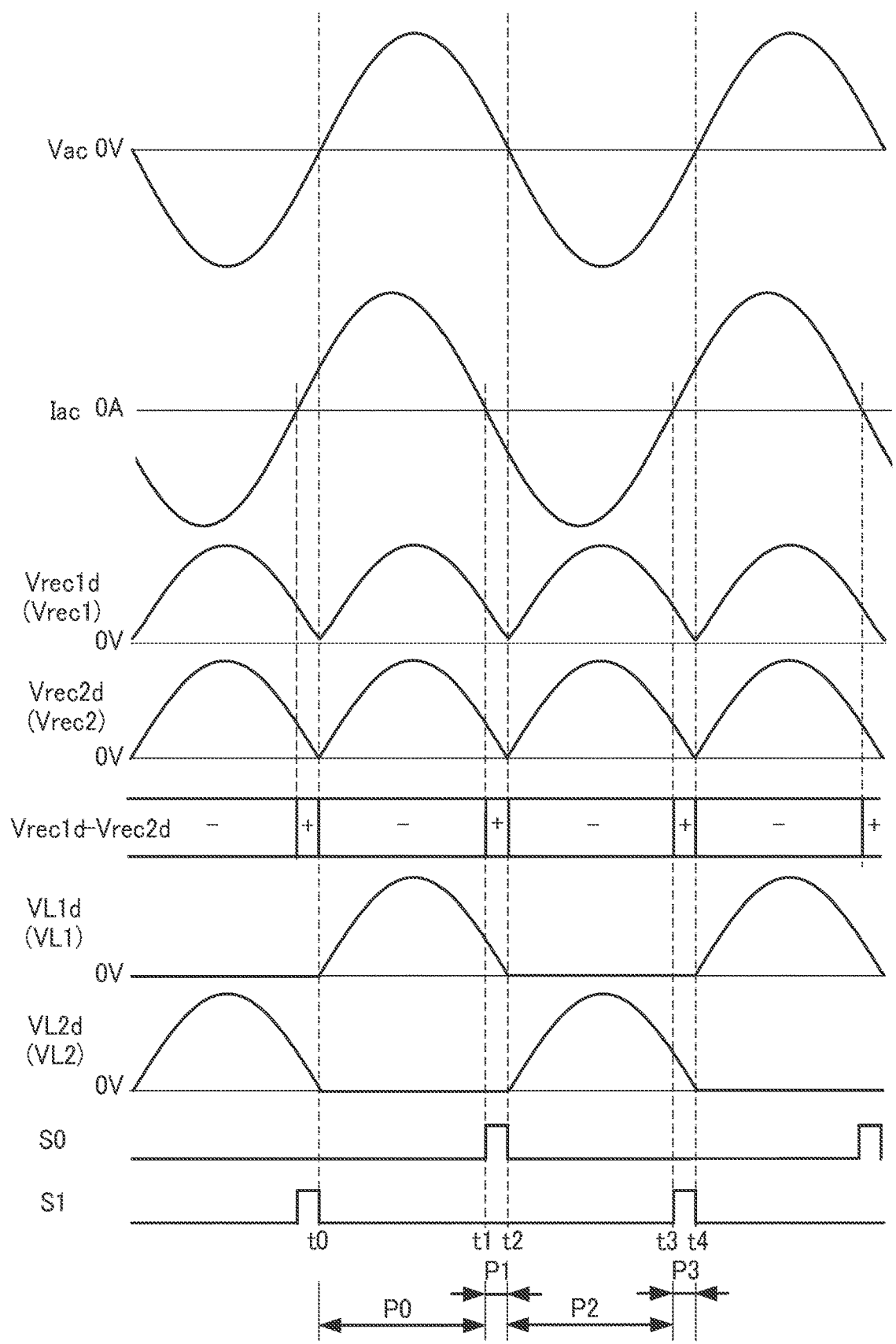

Operation of Full-Wave Rectifier Circuit 20a and Control Block 23a:

FIG. 5 is a diagram illustrating a main waveform of the control block 23a. FIGS. 6 to 9 are diagrams illustrating a path of a current flowing through the full-wave rectifier circuit 20a and the like in periods P0 to P3 described below. In FIG. 5, a period from a time t0 to a time t1 is expressed as the period P0, a period from the time t1 to a time t2 is expressed as the period P1, a period from the time t2 to a time t3 is expressed as the period P2, and a period from the time t3 to a time t4 is expressed as the period P3. The periods P1 and P3 correspond to the "off period P" in which the diodes 50 to 53 turn off, the period P1 corresponds to the period PA in which the diodes 50 and 53 turn off from on, and the period P3 corresponds to the period PB in which the diodes 51 and 52 turn off from on.

In FIGS. 6 to 9, a path in which the AC current Iac flows is indicated by a broken line, and a path in which a current flows through the resistors 90 and 91 or the resistors 92 and 93 is indicated by a dot-and-dash line. As illustrated in FIGS. 4A to 4D, in the present embodiment, when the voltage VL1 of the line L1 and the voltage VL2 of the line L2 are equal to each other, the AC voltage Vac is 0 V. Furthermore, in the present embodiment, when the voltage VL1 of the line L1 is higher than the voltage VL2 of the line L2, a level of the AC voltage Vac is positive (>0), and when the voltage VL1 of the line L1 is lower than the voltage VL2 of the line L2, a level of the AC voltage Vac is negative (<0).

Operation in Period P0:

At the time t0, the voltage Vrec1 of the capacitor 21 decreases to substantially zero. When the voltage Vrec1 of the capacitor 21 is lower than the voltage VL1 of the line L1 by the forward voltage of the diode 50, i.e., when Vrec1d-Vrec2d is negative, the diode 50 turns on. Then, the AC current Iac flows from the line L1 to the capacitor 21 via the diode 50.

Figure 6:
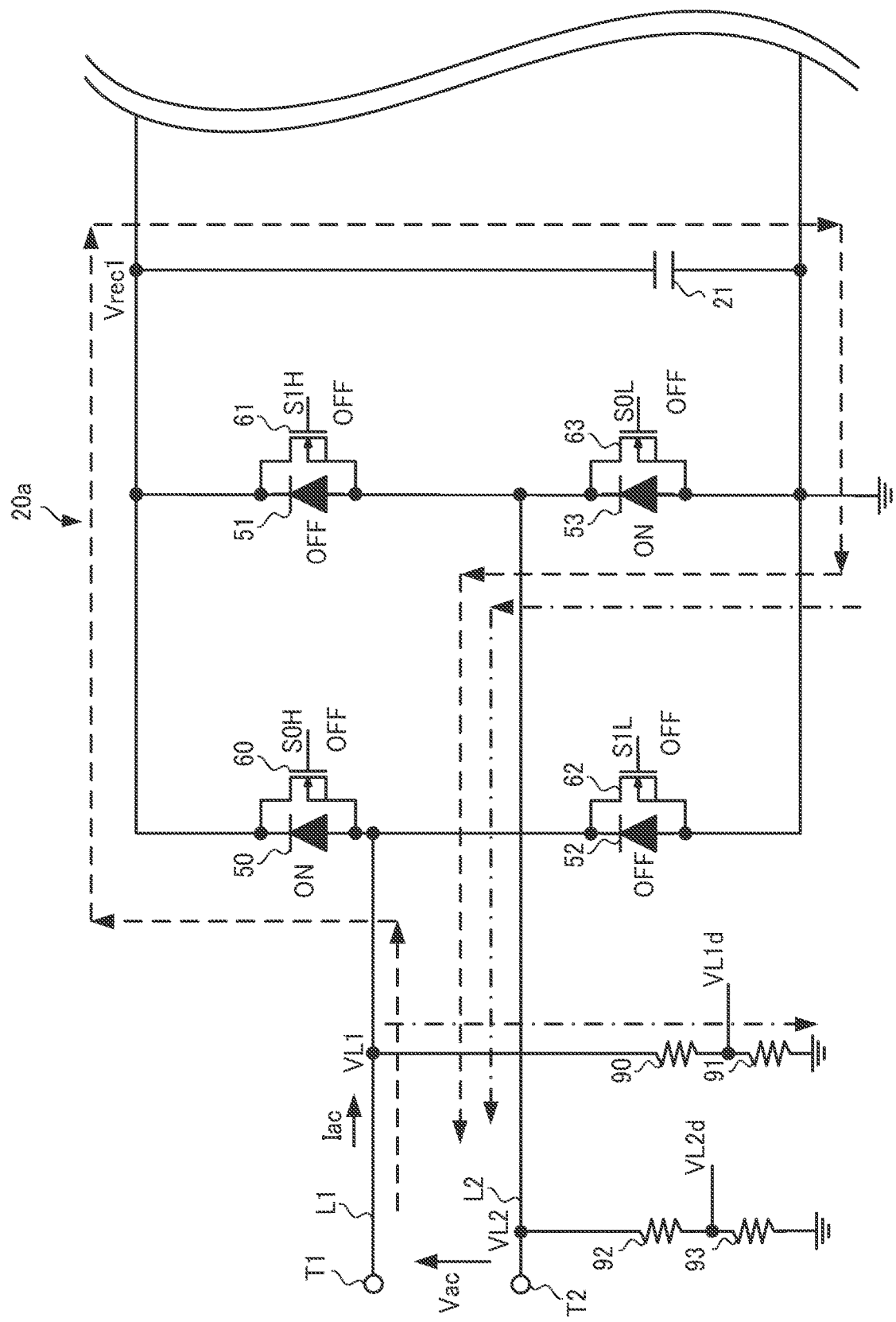
FIG. 6 is a diagram illustrating a current path in a period PG.

As a result, in the period P0 starting from the time t0, the AC current Iac flows in the positive direction as indicated by a broken line in FIG. 6. Specifically, at the time t0, since the rectified voltage Vrec1 is applied to the capacitor 21 before the time t0, a phase of the AC current Iac with respect to a phase of the AC voltage Vac is a leading phase, and the AC current Iac flows in the positive direction in such a manner. Note that, in FIGS. 6 to 9, the rectified voltages Vrec1 and Vrec2 acquired by performing full-wave rectification on the AC voltage Vac are both the positive voltages, and the voltages Vrec1d and Vrec2d are also the positive voltages.

When the voltage VL1 of the line L1 rises in the period P0, the diode 53 turns on similarly to the diode 50. As a result, the AC current Iac flows to the line L2 via the diode 53. In this case, the voltage VL2 of the line L2 is maintained to be a voltage that is lower than the ground voltage by the forward voltage of the diode 53.

Returning to FIG. 5, in the period P0, the voltage VL1 of the line L1 and the voltage VL1d acquired by dividing the voltage VL1 by the resistors 90 and 91 similarly change. In this case, a current as indicated by a dot-and-dash line in FIG. 6 flows through the resistors 90 and 91. On the other hand, since the voltage VL2 of the line L2 is maintained to be a potential that is lower than the ground potential by the forward voltage of the diode 53, the voltage VL2d is substantially the ground voltage. Note that, in FIG. 5, a voltage of a potential that is lower than the ground potential by the forward voltage of the diode 53 is described as the ground voltage (0V) for the sake of convenience.

Since the voltage Vrec1 of the capacitor 21 is lower than the voltage VL1 of the line L1 by the forward voltage of the diode 50 in the period P0, the rectified voltage Vrec1 is lower than the rectified voltage Vrec2. Therefore, since the voltage Vrec1d is lower than the voltage Vrec2d and the voltage VL1d is the positive voltage, the control circuit 100a outputs the signal S0 at the "L" level and turns off the NMOS transistors 60 and 63. Similarly, since the voltage Vrec1d is lower than the voltage Vrec2d and the voltage VL2d is substantially the ground voltage, the control circuit 100a outputs the signal S1 at the "L" level and turns off the NMOS transistors 61 and 62.

Operation in Period P1:

In the period P1 starting from the time t1, when the voltage Vrec1 of the capacitor 21 is higher than a voltage acquired by subtracting the forward voltage of the diode 50 from the voltage VL1 of the line L1, i.e., when Vrec1d-Vrec2d is positive, the diode 50 turns off. Then, the AC current Iac does not flow from the line L1 via the diode 50. In this case, although details will be described below, the control circuit 100a outputs the signal S0 for turning on the NMOS transistors 60 and 63. Thus, the AC current Iac flows to the line L1 via the NMOS transistor 60. Then, a direction in which the AC current Iac flows is the negative direction indicated by a broken line in FIG. 7, and thus the AC current Iac flows through the capacitor 21 from the ground side to the high potential side.

Then, when the voltage VL1 of the line L1 decreases and the diode 50 turns off in the period P1, the diode 53 also turns off. Since the NMOS transistor 63 turns on and the AC current Iac flows in the direction of the broken line in FIG. 6, the voltage VL2 of the line L2 is maintained to be a voltage higher than the ground voltage by a voltage between the drain and the source of the NMOS transistor 63.

Returning to FIG. 5, in the period P1, the voltage VL1 of the line L1 and the voltage VL1d similarly change. On the other hand, since the voltage VL2 of the line L2 is maintained to be a voltage higher than the ground voltage by the voltage between the drain and the source of the NMOS transistor 63, the voltage VL2d is the ground voltage. Note that, in FIG. 5, a voltage of a potential higher than the ground potential by the voltage between the drain and the source of the NMOS transistor 63 is described as the ground voltage (0V) for the sake of convenience.

Since the voltage Vrec1 of the capacitor 21 is higher than a voltage acquired by subtracting the forward voltage of the diode 50 from the voltage VL1 of the line L1 in the period P1, the rectified voltage Vrec1 is higher than the rectified voltage Vrec2. Therefore, since the voltage Vrec1d is higher than the voltage Vrec2d and the voltage VL1d is the positive voltage, the control circuit 100a outputs the signal S0 at the "H" level and turns on the NMOS transistors 60 and 63. Similarly, since the voltage Vrec1d is higher than the voltage Vrec2d and the voltage VL2d is substantially the ground voltage, the control circuit 100a outputs the signal S1 at the "L" level and turns off the NMOS transistors 61 and 62.

Operation in Period P2:

In the period P2 starting from the time T2, when the voltage Vrec1 of the capacitor 21 is lower than the voltage VL2 of the line L2 by the forward voltage of the diode 51, i.e., when Vrec1d−Vrec2d is negative, the diode 51 turns on. Then, the AC current Iac flows from the line L2 to the capacitor 21 via the diode 51. As a result, in the period P2, the AC current Iac flows in the negative direction as indicated by a broken line in FIG. 8.

When the voltage VL2 of the line L2 rises in the period P2, the diode 52 turns on similarly to the diode 51. As a result, the AC current Iac flows to the line L1 via the diode 52. In this case, the voltage VL1 of the line L1 is maintained to be a voltage that is lower than the ground voltage by the forward voltage of the diode 52.

Returning to FIG. 5, in the period P2, the voltage VL2 of the line L2 and the voltage VL2d acquired by dividing the voltage VL2 by the resistors 92 and 93 similarly change. On the other hand, since the voltage VL1 of the line L1 is maintained to be a voltage that is lower than the ground voltage by the forward voltage of the diode 52, the voltage VL1d is substantially the ground voltage. Note that, in FIG. 5, a voltage of a potential that is lower than the ground potential by the forward voltage of the diode 52 is described as the ground voltage (0V) for the sake of convenience.

Since the voltage Vrec1 of the capacitor 21 is lower than the voltage VL2 of the line L2 by the forward voltage of the diode 51 in the period P2, the rectified voltage Vrec1 is lower than the rectified voltage Vrec2. Therefore, since the voltage Vrec1d is lower than the voltage Vrec2d and the voltage VL1d is the ground voltage, the control circuit 100a outputs the signal S0 at the "L" level and turns off the NMOS transistors 60 and 63. Similarly, since the voltage Vrec1d is lower than the voltage Vrec2d and the voltage VL2d is the positive voltage, the control circuit 100a outputs the signal S1 at the "L" level and turns off the NMOS transistors 61 and 62.

Operation in Period P3:

In the period P3 starting from the time t3, when the voltage Vrec1 of the capacitor 21 is higher than a voltage acquired by subtracting the forward voltage of the diode 51 from the voltage VL2 of the line L2, i.e., when Vrec1d−Vrec2d is positive, the diode 51 turns off. Then, the AC current Iac does not flow from the line L2 via the diode 51. In this case, although details will be described below, the control circuit 100a outputs the signal S1 for turning on the NMOS transistors 61 and 62. Thus, the AC current Iac flows to the line L2 via the NMOS transistor 61. Then, although a direction in which the AC current Iac flows is the positive direction indicated by a broken line in FIG. 9, the voltage Vrec1 of the capacitor 21 is higher than the voltage VL2 of the line L2 by a voltage between a drain and a source of the NMOS transistor 61 or more, and thus the AC current Iac flows through the capacitor 21 from the ground side to the high voltage side.

Then, when the voltage VL2 of the line L2 decreases and the diode 51 turns off in the period P3, the diode 52 also turns off. Since the NMOS transistor 62 turns on and the AC current Iac flows in the direction of the broken line in FIG. 9, the voltage VL1 of the line L1 is maintained to be a voltage higher than the ground voltage by a voltage between a drain and a source of the NMOS transistor 62. Note that, in FIG. 5, a voltage of a potential higher than the ground potential by the voltage between the drain and the source of the NMOS transistor 62 is described as the ground voltage (0V) for the sake of convenience.

Returning to FIG. 5, in the period P3, the voltage VL2 of the line L2 and the voltage VL2d similarly change. On the other hand, since the voltage VL1 of the line L1 is maintained to be a voltage higher than the ground voltage by the voltage between the drain and the source of the NMOS transistor 62, the voltage VL1d is substantially the ground voltage.

Since the voltage Vrec1 of the capacitor 21 is higher than a voltage acquired by subtracting the forward voltage of the diode 51 from the voltage VL2 of the line L2 in the period P3, the rectified voltage Vrec1 is higher than the rectified voltage Vrec2. Therefore, since the voltage Vrec1d is higher than the voltage Vrec2d and the voltage VL1d is substantially the ground voltage, the control circuit 100a outputs the signal S0 at the "L" level and turns off the NMOS transistors 60 and 63. Similarly, since the voltage Vrec1d is higher than the voltage Vrec2d and the voltage VL2d is the positive voltage, the control circuit 100a outputs the signal S1 at the "H" level and turns on the NMOS transistors 61 and 62. In this way, the NMOS transistors 60 to 63 turn on only in a period in which the AC voltage Vac is around 0 V and the AC current Iac is small, and thus the NMOS transistors 60 to 63 can be formed into small elements.

Note that a similar operation is repeated at and after the time t4.

In FIG. 2, the power factor correction IC 33 in FIG. 1 and the control circuit 100a are described as different circuits, but the two circuits may be formed of one integrated circuit. The integrated circuit may also include an element (for example, the diodes 71 and 70, the resistors 72 and 73, or the like) of the control block 23a except for the control circuit 100a.

Other Embodiment

Figure 10:
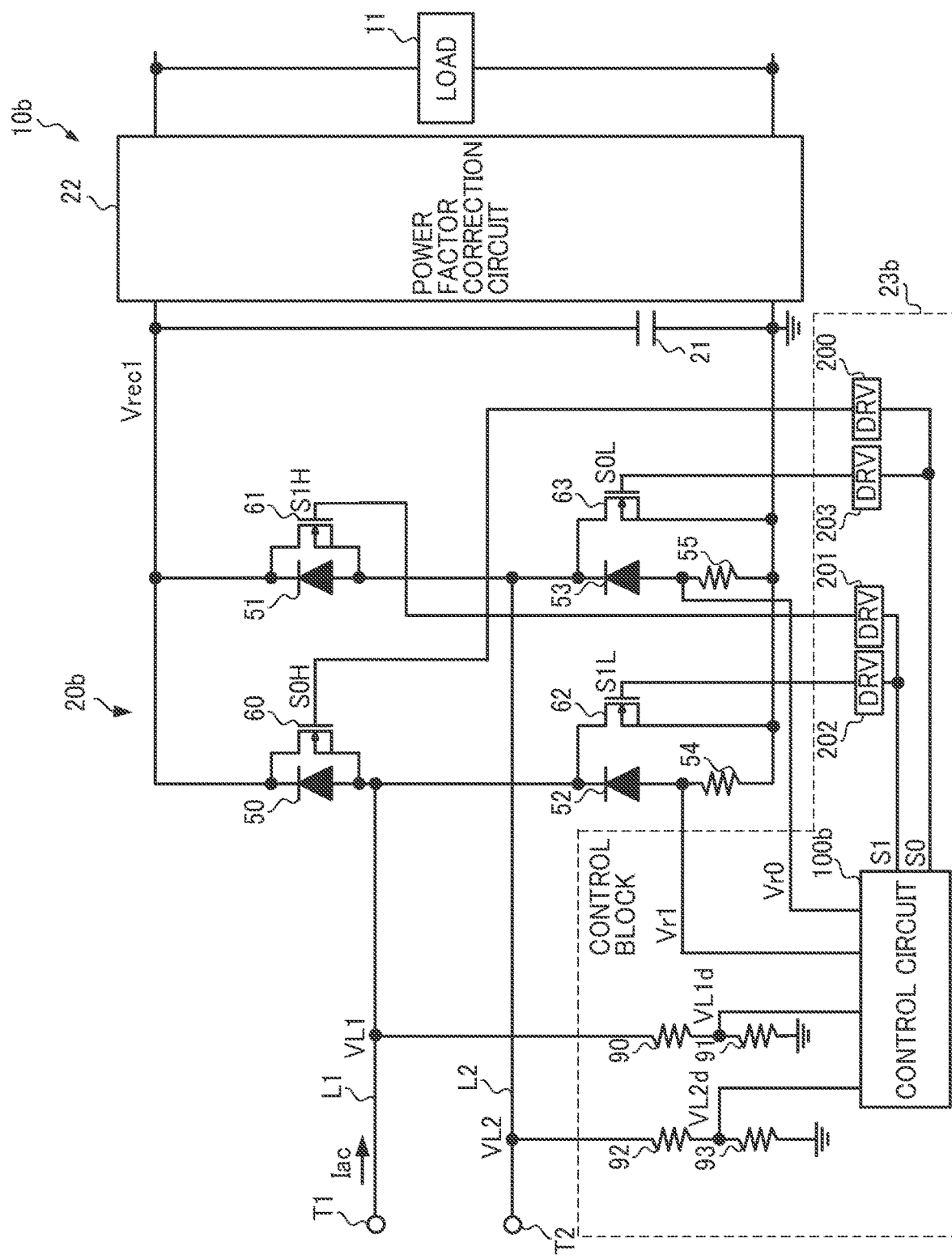
FIG. 10 is a diagram illustrating one example of a full-wave rectifier circuit 20b and a control block 23b.

Embodiment in which Current Flowing through Diodes 52 and 53 is Detected:

Configuration of Full-Wave Rectifier Circuit 20b and Control Block 23b:

FIG. 10 is a diagram illustrating one example of a full-wave rectifier circuit 20b and a control block 23b. In contrast to the full-wave rectifier circuit 20a, the full-wave rectifier circuit 20b further includes resistors 54 and 55 having one end connected to each anode of diodes 52 and 53 and the other end grounded in order to detect a current flowing through the diodes 52 and 53. The control block 23b includes resistors 90 to 93, a control circuit 100b, and driver circuits 200 to 203. Note that, since the resistors 54 and 55 are resistors for detecting a current flowing through the diodes 52 and 53, respectively, a resistance value is assumed to be minute.

Figure 11:
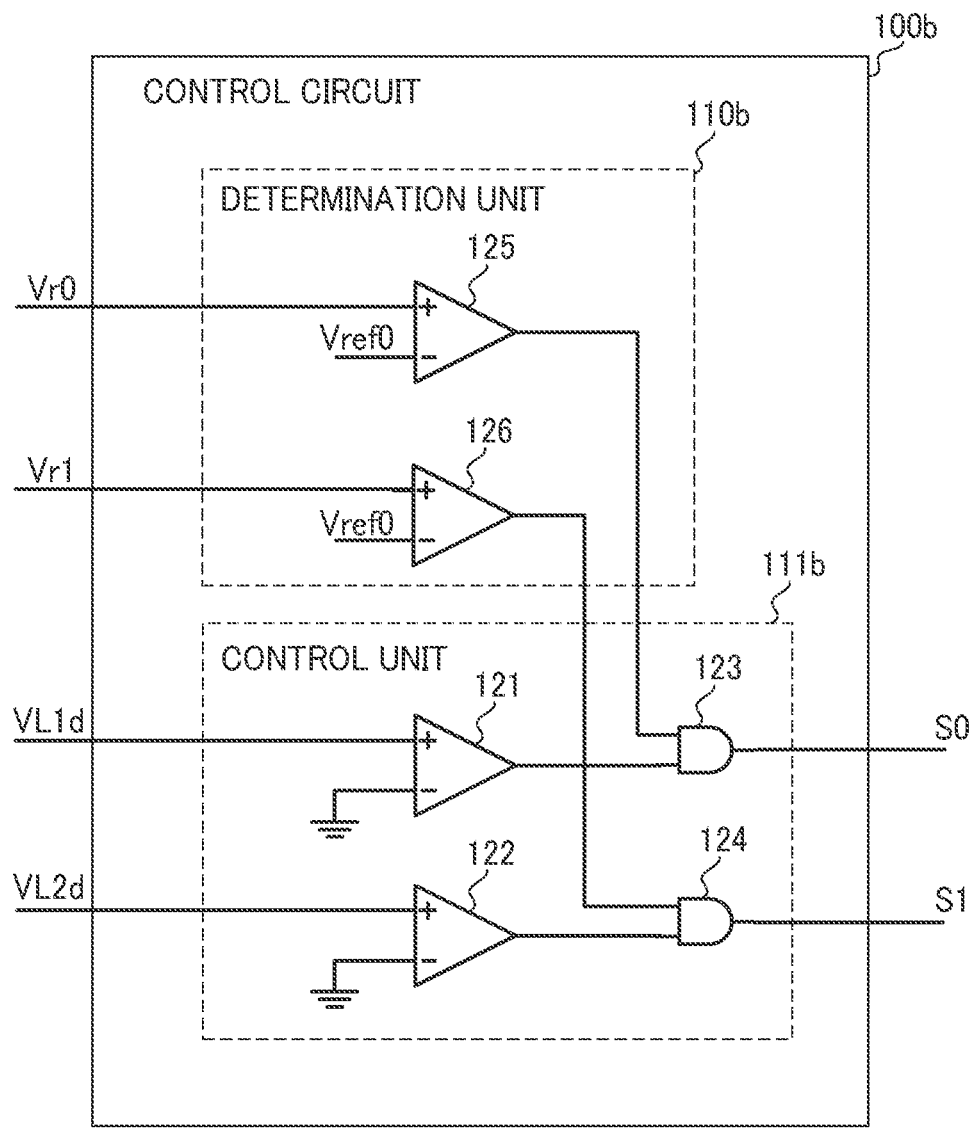
FIG. 11 is a diagram illustrating one example of a control circuit 100b.

Configuration of Control Circuit 100b:

FIG. 11 is a diagram illustrating one example of the control circuit 100b. The control circuit 100b outputs a signal S0 for turning on NMOS transistors 60 and 63 in a period PA, and a signal S1 for turning on NMOS transistors 61 and 62 in a period PB. Specifically, the control circuit 100b determines a period P, based on currents flowing through the diodes 52 and 53. In other words, the control circuit 100b determines the period P, based on voltages generated at the resistors 54 and 55. Then, in the period P, the control circuit 100*b* turns on the NMOS transistors 60 and 63 in the period PA, and turns on the NMOS transistors 61 and 62 in the period PB.

The control circuit 100*b* includes a determination unit 110*b* and a control unit 111*b*. The determination unit 110*b* includes a comparison circuit 125 and a comparison circuit 126. The comparison circuit 125 compares a voltage Vr0 generated in the resistor 55 with a reference voltage Vref0 being a minute negative voltage. Then, the comparison circuit 126 compares a voltage Vr1 generated in the resistor 54 with the reference voltage Vref0.

When a current does not flow through the diode 53, the voltage Vr0 generated in the resistor 55 is the ground voltage. Thus, when a current does not flow through the diode 53, the comparison circuit 125 outputs a signal indicating the period P at the "H" level in order to turn on the NMOS transistors 60 and 63. Similarly, when a current does not flow through the diode 52, the voltage Vr1 generated in the resistor 54 is the ground voltage. Thus, when a current does not flow through the diode 52, the comparison circuit 126 outputs a signal indicating the period P at the "H" level in order to turn on the NMOS transistors 61 and 62.

On the other hand, when a current flows through each of the diodes 52 and 53, the voltages Vr0 and Vr1 are each a negative voltage, and thus the comparison circuits 125 and 126 each output a signal at the "L" level.

The control unit 111*b* turns on the NMOS transistors 60 and 63 in the period PA, and turns on the NMOS transistors 61 and 62 in the period PB. Specifically, the control unit 111*b* outputs the signal S0 for turning on and off the NMOS transistors 60 and 63 and the signal S1 for turning on and off the NMOS transistors 61 and 62, based on a relationship between voltages of lines L1 and L2, and the signals indicating the period P from the comparison circuits 125 and 126. Note that the configuration of the control unit 111*b* is substantially similar to the configuration of the control unit 111*a*, and thus description will be omitted.

Figure 12:
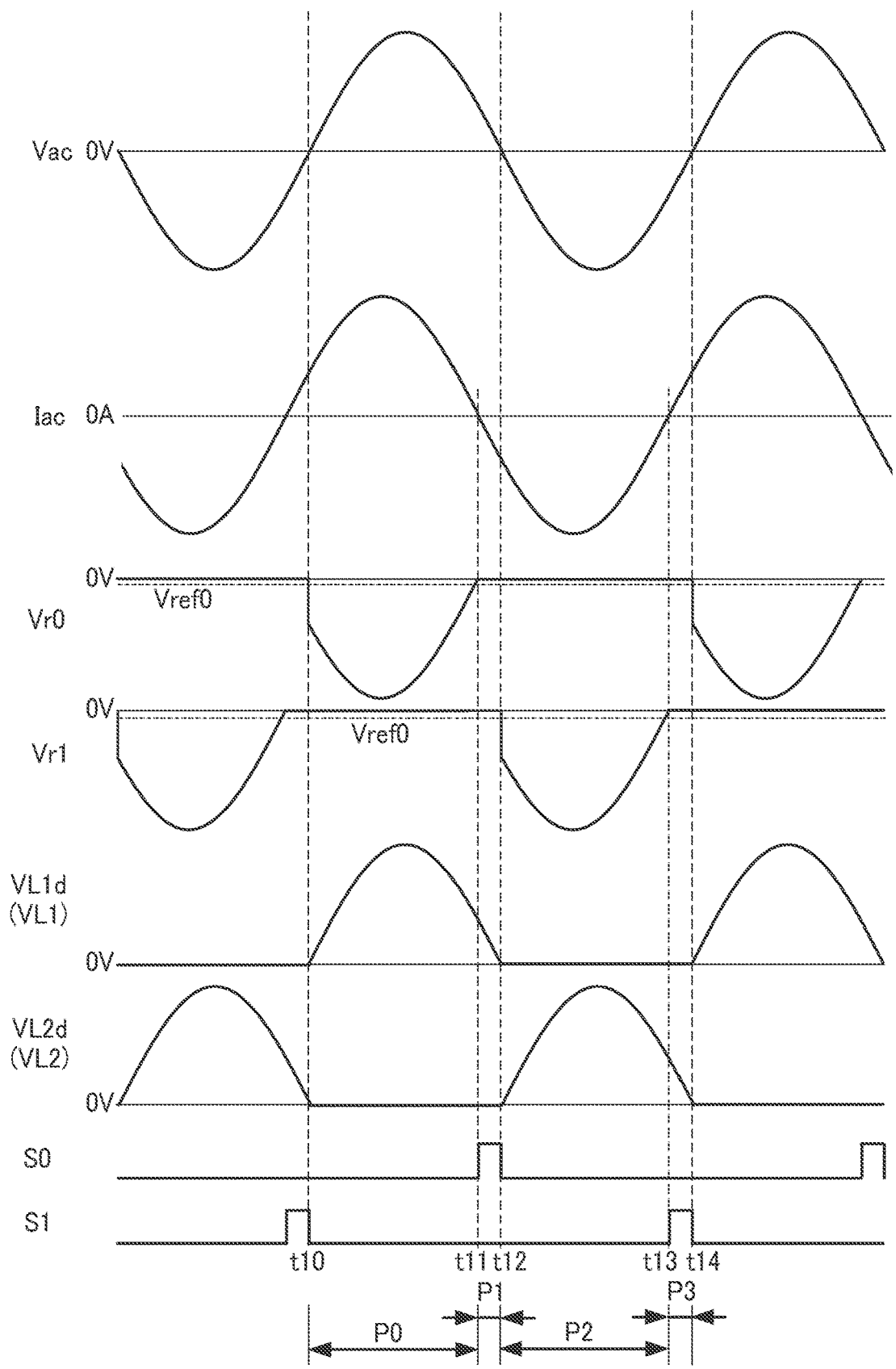
FIG. 12 is a diagram illustrating a main waveform of the control block 23b.

Operation of Full-Wave Rectifier Circuit 20*b* and Control Block 23*b*:

FIG. 12 is a diagram illustrating a main waveform of the control block 23*b*. In FIG. 12, a period from a time t10 to a time t1*l* is expressed as a period P0, a period from the time t1*l* to a time t12 is expressed as a period P1, a period from the time t12 to a time t13 is expressed as a period P2, and a period from the time t13 to a time t14 is expressed as a period P3.

Operation in Period P0:

As described in FIG. 6, a current flows through the diode 53 in the period P0 starting from the time t10. Thus, the voltage Vr0 is the negative voltage. On the other hand, a current does not flow through the diode 52, and thus the voltage Vr1 is the ground voltage. Therefore, the comparison circuit 125 outputs the signal at the "L" level, and the comparison circuit 126 outputs the signal at the "H" level.

Since a voltage VL1*d* is the positive voltage in the period P0, the comparison circuit 121 outputs the signal at the "H" level, but an AND circuit 123 outputs the signal S0 at the "L" level for turning off the NMOS transistors 60 and 63. Similarly, since a voltage VL2*d* is the ground voltage in the period P0, the comparison circuit 122 outputs the signal at the "L" level, and an AND circuit 124 outputs the signal S1 at the "L" level for turning off the NMOS transistors 61 and 62.

Figure 7:
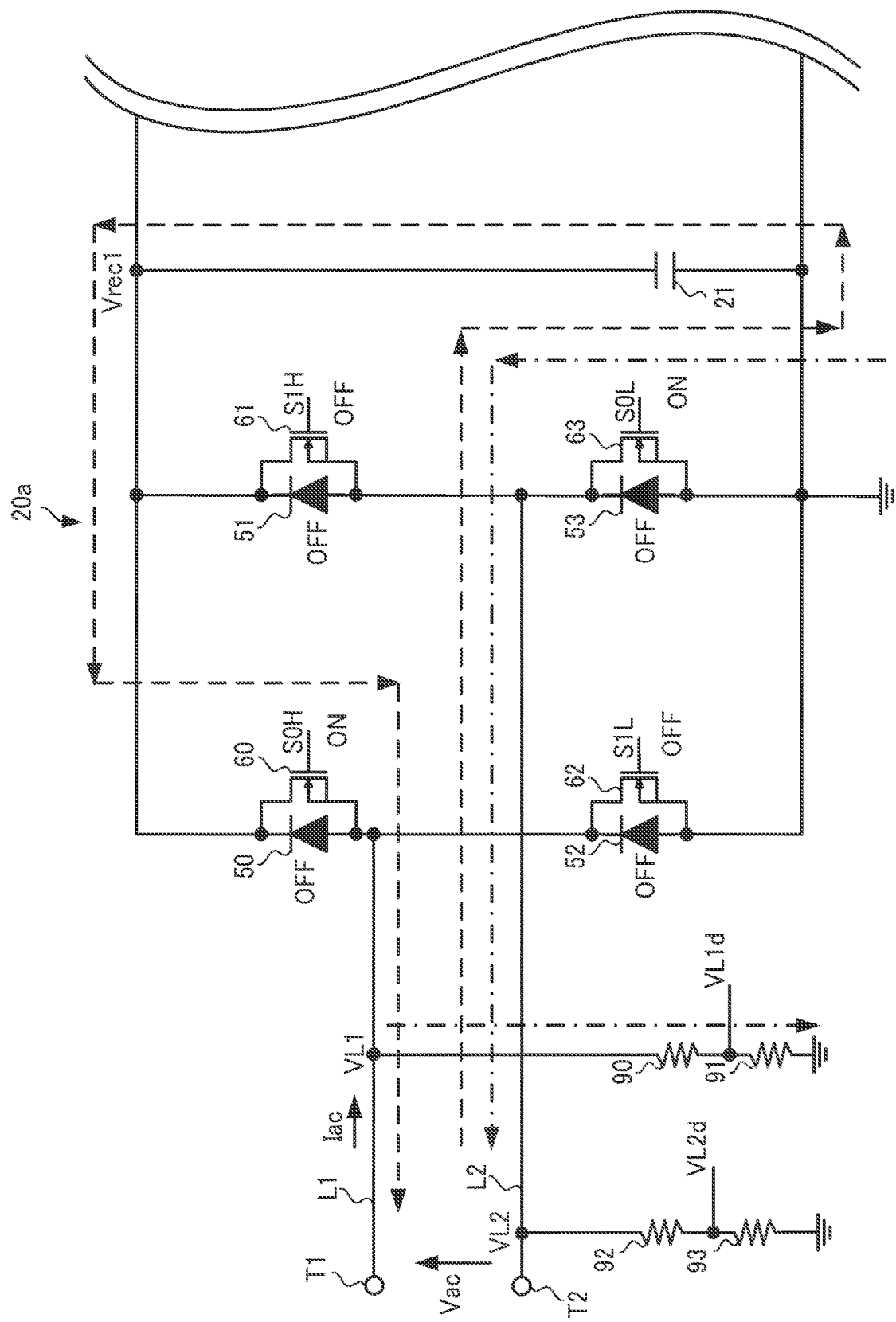
FIG. 7 is a diagram illustrating a current path in a period P1.

Operation in Period P1:

As described in FIG. 7, a current does not flow through the diode 53 and the voltage Vr0 is the ground voltage in the period P1 starting from the time t1*l*. A current does not also flow through the diode 52, and thus the voltage Vr1 is the ground voltage. Therefore, the comparison circuits 125 and 126 output the signal at the "H" level.

Since the voltage VL1*d* is the positive voltage, and the comparison circuit 121 outputs the signal at the "H" level in the period P1, the AND circuit 123 outputs the signal S0 at the "H" level for turning on the NMOS transistors 60 and 63. On the other hand, since the voltage VL2*d* is substantially the ground voltage, and the comparison circuit 122 outputs the signal at the "L" level in the period P1, the AND circuit 124 outputs the signal S1 at the "L" level for turning off the NMOS transistors 61 and 62.

Figure 8:
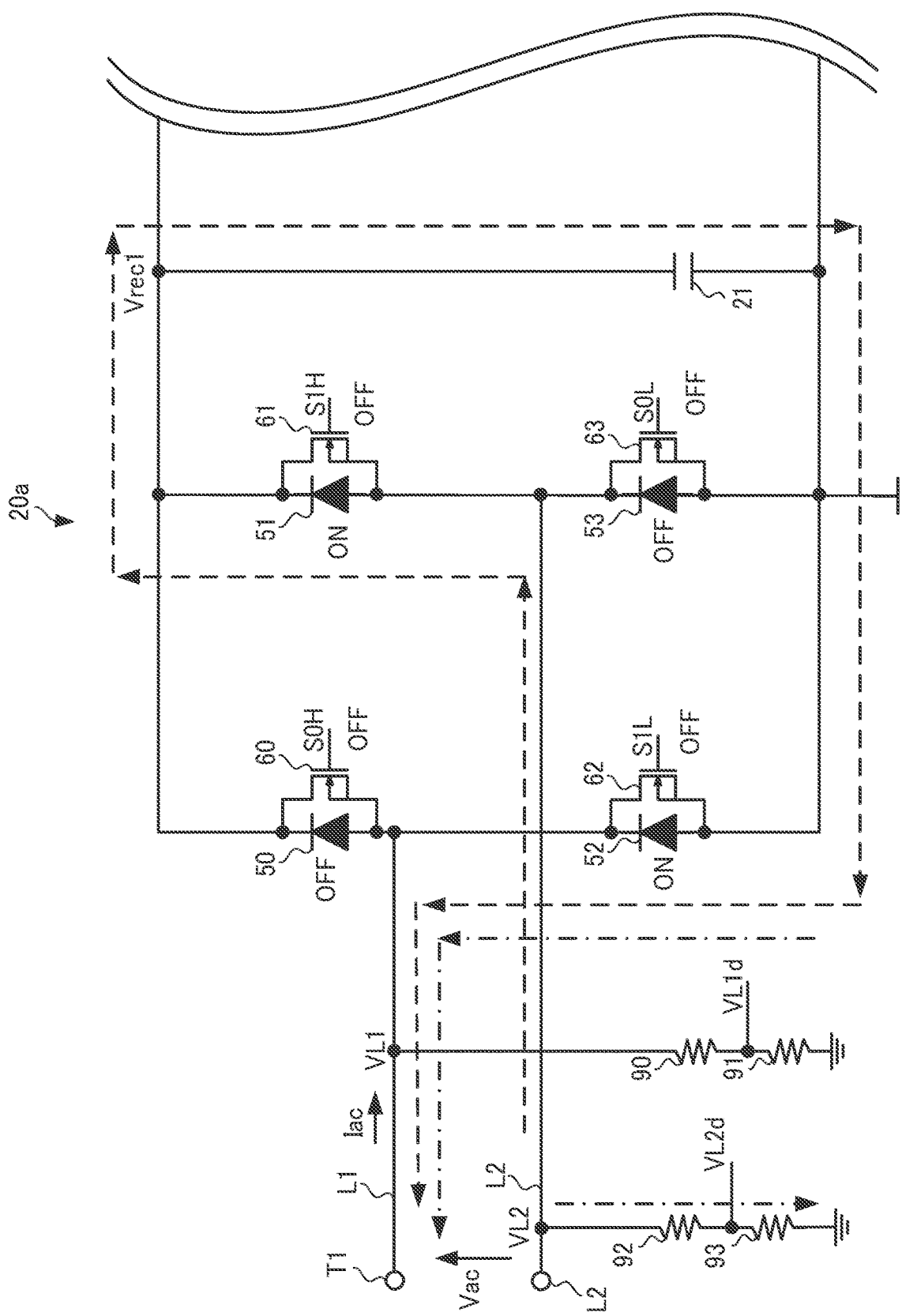
FIG. 8 is a diagram illustrating a current path in a period P2.

Operation in Period P2:

As described in FIG. 8, a current does not flow through the diode 53 and the voltage Vr0 is the ground voltage in the period P2 starting from the time t12. On the other hand, a current flows through the diode 52, and thus the voltage Vr1 is the negative voltage. Therefore, the comparison circuit 125 outputs the signal at the "H" level, and the comparison circuit 126 outputs the signal at the "L" level.

Since the voltage VL1*d* is the ground voltage, and the comparison circuit 121 outputs the signal at the "L" level in the period P2, the AND circuit 123 outputs the signal S0 at the "L" level for turning off the NMOS transistors 60 and 63. Similarly, since the voltage VL2*d* is the positive voltage, and the comparison circuit 122 outputs the signal at the "H" level in the period P2, the AND circuit 124 outputs the signal at the "L" level for turning off the NMOS transistors 61 and 62.

Figure 9:
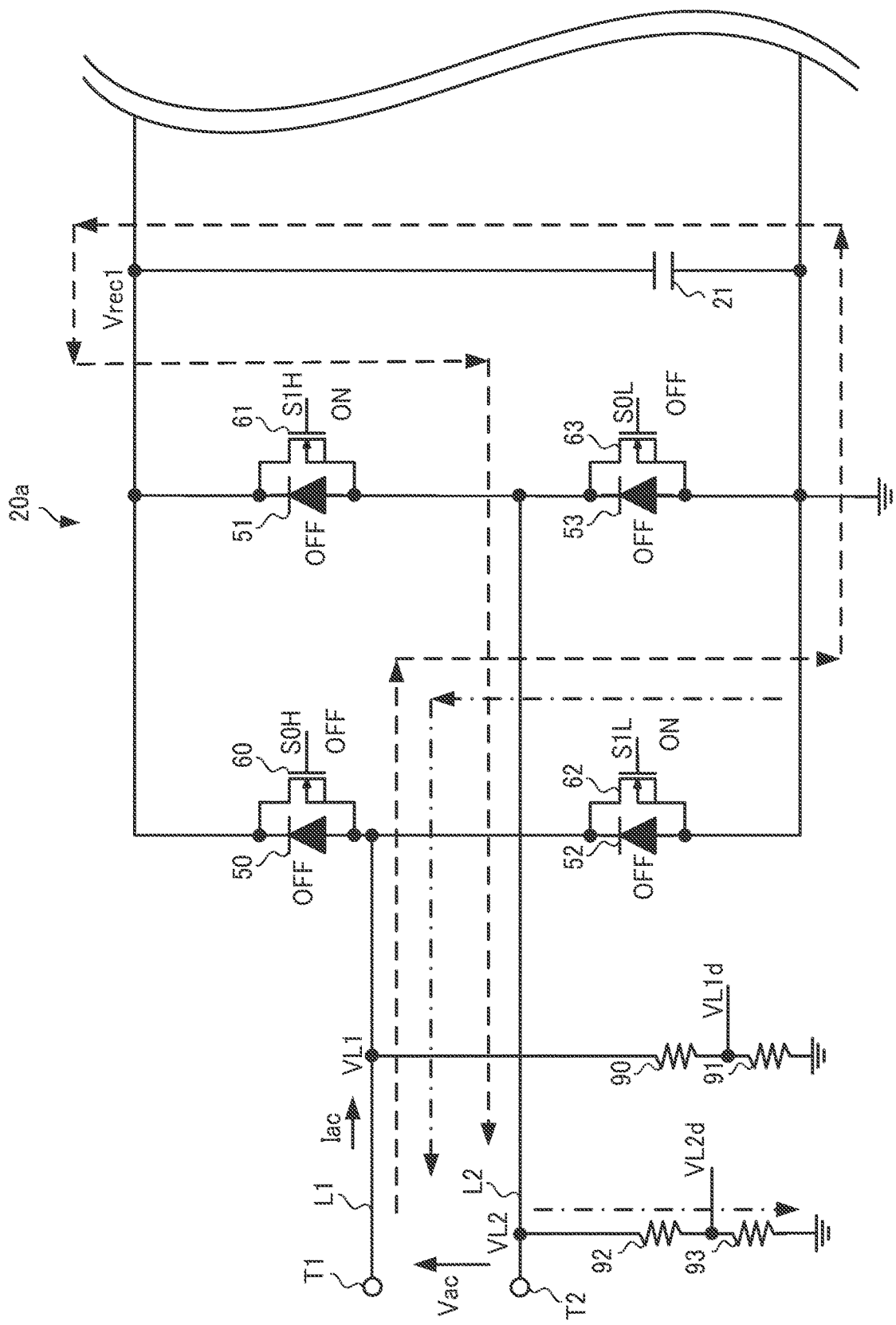
FIG. 9 is a diagram illustrating a current path in a period P3.

Operation in Period P3:

As described in FIG. 9, a current does not flow through the diode 53 and the voltage Vr0 is the ground voltage in the period P3 starting from the time t13. A current does not flow through the diode 52, and thus the voltage Vr1 is the ground voltage. Therefore, the comparison circuits 125 and 126 output the signal at the "H" level.

Since the voltage VL1*d* is substantially the ground voltage, and the comparison circuit 121 outputs the signal at the "L" level in the period P3, the AND circuit 123 outputs the signal S0 at the "L" level for turning off the NMOS transistors 60 and 63. On the other hand, since the voltage VL2*d* is the positive voltage, and the comparison circuit 122 outputs the signal at the "H" level in the period P3, the AND circuit 124 outputs the signal S1 at the "H" level for turning on the NMOS transistors 61 and 62.

Note that a similar operation is repeated at and after the time t14.

In FIG. 10, the power factor correction IC 33 in FIG. 1 and the control circuit 100*b* are described as different circuits, but the two circuits may be formed of one integrated circuit. The integrated circuit may also include an element (i.e., the resistors 90 to 93) of the control block 23*b* except for the control circuit 100*b*.

Figure 13:
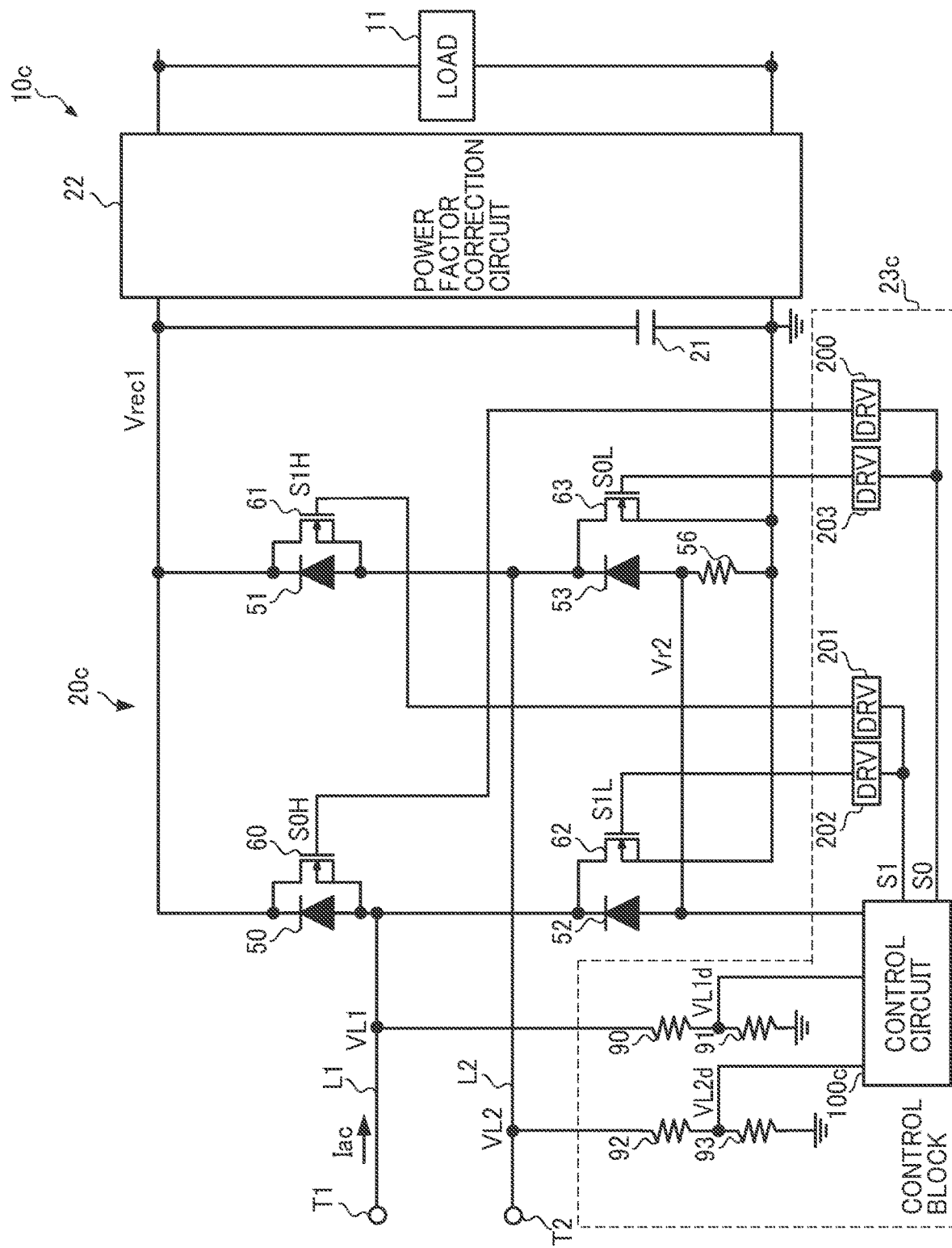
FIG. 13 is a diagram illustrating one example of a full-wave rectifier circuit 20c and a control block 23c.

Another Embodiment in which Current Flowing Through Diodes 52 and 53 is Detected:

Configuration of Full-Wave Rectifier Circuit 20*c* and Control Block 23*c*:

FIG. 13 is a diagram illustrating one example of a full-wave rectifier circuit 20*c* and a control block 23*c*. In contrast to the full-wave rectifier circuit 20*b*, the full-wave rectifier circuit 20*c* includes, instead of the resistors 54 and 55, a resistor 56 having one end connected to each anode of diodes 52 and 53 and the other end grounded in order to detect a current flowing through the diodes 52 and 53. The control block 23*c* includes resistors 90 to 93, a control circuit 100*c*, and driver circuits 200 to 203. Note that, since the resistor 56 is a resistor for detecting a current flowing through each of the diodes 52 and 53, a resistance value is assumed to be minute.

Figure 14:
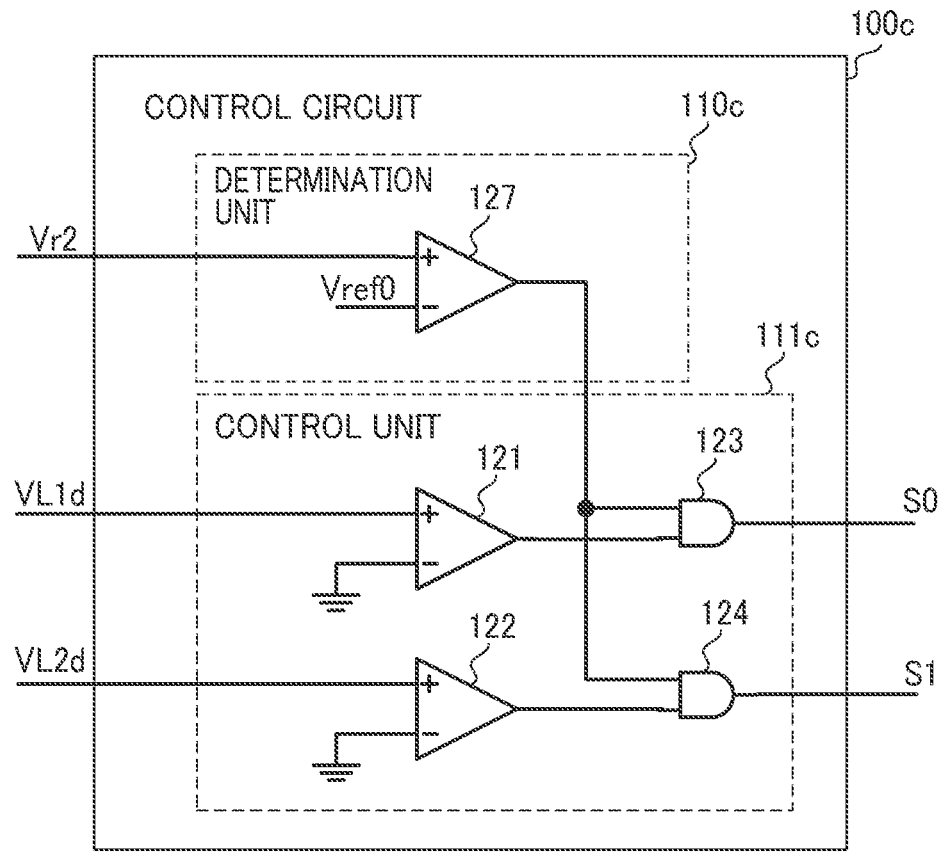
FIG. 14 is a diagram illustrating one example of a control circuit 100c.

Configuration of Control Circuit 100c:

FIG. 14 is a diagram illustrating one example of the control circuit 100c. The control circuit 100c outputs a signal S0 for turning on NMOS transistors 60 and 63 in a period PA, and a signal S1 for turning on NMOS transistors 61 and 62 in a period PB. Specifically, the control circuit 100c determines a period P, based on currents flowing through the diodes 52 and 53. In other words, the control circuit 100c determines the period P, based on a voltage generated at the resistor 56. Then, in the period P, the control circuit 100c turns on the NMOS transistors 60 and 63 in the period PA, and turns on the NMOS transistors 61 and 62 in the period PB.

The control circuit 100c includes a determination unit 110c and a control unit 111c. The determination unit 110c can be achieved by a comparison circuit 127 configured to compare a voltage Vr2 generated at the resistor 56 with a reference voltage Vref0 being a minute negative voltage.

When a current does not flow through the diodes 52 and 53, the voltage Vr2 generated in the resistor 56 is the ground voltage. Thus, when a current does not flow through the diodes 52 and 53, the comparison circuit 127 outputs a signal at the "H" level.

On the other hand, when a current flows through the diode 52 or 53, the voltage Vr2 is the negative voltage, and thus the comparison circuit 127 outputs a signal at the "L" level.

The control unit 111c turns on the NMOS transistors 60 and 63 in the period PA, and turns on the NMOS transistors 61 and 62 in the period PB. Specifically, the control unit 111c outputs the signal S0 for turning on and off the NMOS transistors 60 and 63 and the signal S1 for turning on and off the NMOS transistors 61 and 62, based on a relationship between voltages of lines L1 and L2, and the signal indicating the period P from the comparison circuit 127. Note that the configuration of the control unit 111c is substantially similar to the configuration of the control unit 111b, and thus description will be omitted.

Figure 15:
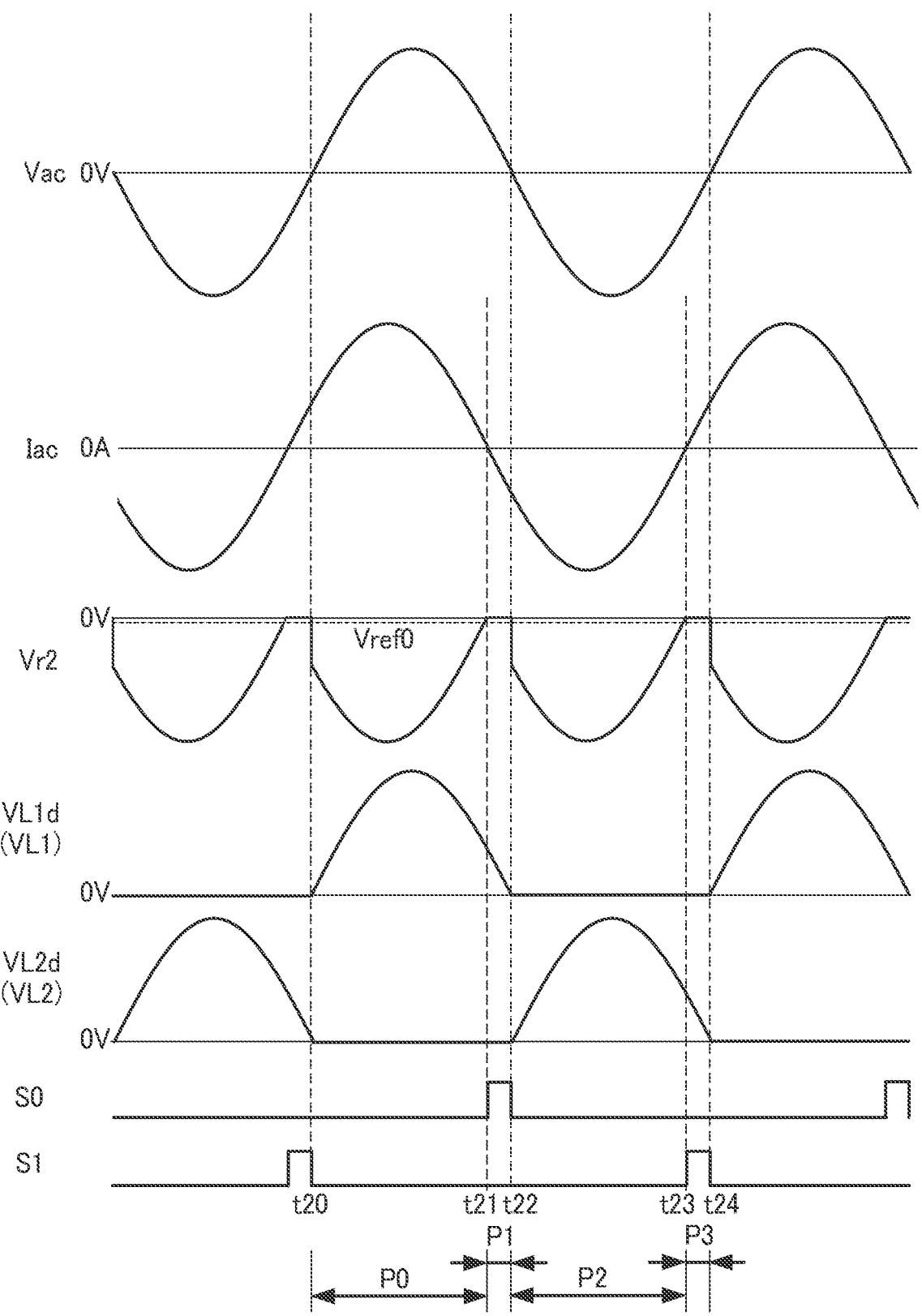
FIG. 15 is a diagram illustrating a main waveform of the control block 23c.

Operation of Full-Wave Rectifier Circuit 20c and Control Block 23c:

FIG. 15 is a diagram illustrating a main waveform of the control block 23c. In FIG. 14, a period from a time t20 to a time t21 is expressed as a period P0, a period from the time t21 to a time t22 is expressed as a period P1, a period from the time t22 to a time t23 is expressed as a period P2, and a period from the time t23 to a time t24 is expressed as a period P3.

Operation in Period P0:

As described in FIG. 6, a current flows through the diode 53, whereas a current does not flow through the diode 52, and thus the voltage Vr2 is the negative voltage in the period P0 starting from the time t20.

Therefore, the comparison circuit 127 outputs the signal at the "L" level.

A voltage VL1d is the positive voltage, and a comparison circuit 121 outputs the signal at the "H" level in the period P0, but an AND circuit 123 outputs the signal S0 at the "L" level for turning off the NMOS transistors 60 and 63. Similarly, since the voltage VL2d is substantially the ground voltage, and the comparison circuit 122 outputs the signal at the "L" level in the period P0, the AND circuit 124 outputs the signal S1 at the "L" level for turning off the NMOS transistors 61 and 62.

Operation in Period P1:

As described in FIG. 7, a current does not flow through the diodes 52 and 53 in the period P1 starting from the time t21. Thus, the voltage Vr2 is the ground voltage. Therefore, the comparison circuit 127 outputs the signal at the "H" level.

Since the voltage VL1d is the positive voltage, and the comparison circuit 121 outputs the signal at the "H" level in the period P1, the AND circuit 123 outputs the signal S0 at the "H" level for turning on the NMOS transistors 60 and 63. On the other hand, since the voltage VL2d is substantially the ground voltage, and the comparison circuit 122 outputs the signal at the "L" level in the period P1, the AND circuit 124 outputs the signal S1 at the "L" level for turning off the NMOS transistors 61 and 62.

Operation in Period P2:

As described in FIG. 8, a current does not flow through the diode 53, whereas a current flows through the diode 52, and thus the voltage Vr2 is the negative voltage in the period P2 starting from the time t22. Therefore, the comparison circuit 127 outputs the signal at the "L" level.

Since the voltage VL1d is substantially the ground voltage, and the comparison circuit 121 outputs the signal at the "L" level in the period P2, the AND circuit 123 outputs the signal S0 at the "L" level for turning off the NMOS transistors 60 and 63. Similarly, since the voltage VL2d is the positive voltage, and the comparison circuit 122 outputs the signal at the "H" level in the period P2, the AND circuit 124 outputs the signal S1 at the "L" level for turning off the NMOS transistors 61 and 62.

Operation in Period P3:

As described in FIG. 9, a current does not flow through the diodes 52 and 53 in the period P3 starting from the time t23. Thus, the voltage Vr2 is the ground voltage. Therefore, the comparison circuit 127 outputs the signal at the "H" level.

Since the voltage VL1d is substantially the ground voltage, and the comparison circuit 121 outputs the signal at the "L" level in the period P3, the AND circuit 123 outputs the signal S0 at the "L" level for turning off the NMOS transistors 60 and 63. On the other hand, since the voltage VL2d is the positive voltage, and the comparison circuit 122 outputs the signal at the "H" level in the period P3, the AND circuit 124 outputs the signal S1 at the "H" level for turning on the NMOS transistors 61 and 62.

Note that a similar operation is repeated at and after the time t24.

In FIG. 13, the power factor correction IC 33 in FIG. 1 and the control circuit 100c are described as different circuits, but the two circuits may be formed of one integrated circuit. The integrated circuit may also include an element (i.e., the resistors 90 to 93) of the control block 23c except for the control circuit 100a.

Embodiments by Microcomputer:

Control Circuit Configured to Detect Start of Period P, Based on AC Voltage Vac:

{Configuration of AC-DC Converter 10d and Control Block 23d}

Figure 16:
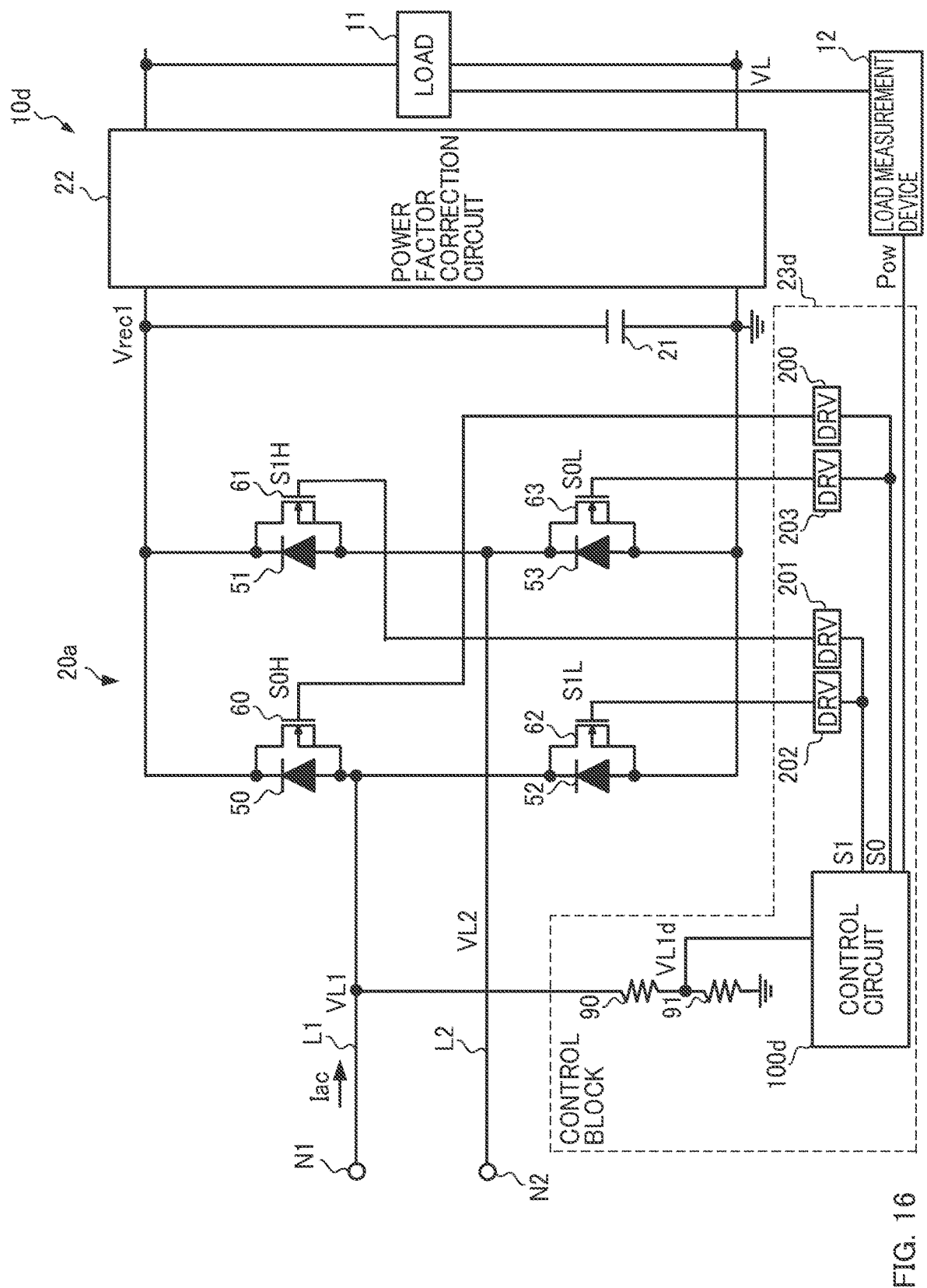
FIG. 16 is a diagram illustrating one example of an AC-DC converter 10d and a control block 23d.

FIG. 16 is a diagram illustrating one example of an AC-DC converter 10d and a control block 23d. In contrast to the AC-DC converter 10a, the AC-DC converter 10d further includes a load measurement device 12 configured to receive information VL indicating a state of a load 11 from the load 11, and output power consumption Pow of the load 11 to a control circuit 100d. The control block 23d includes resistors 90 to 91, the control circuit 100d, and driver circuits 200 to 203.

Figure 17:
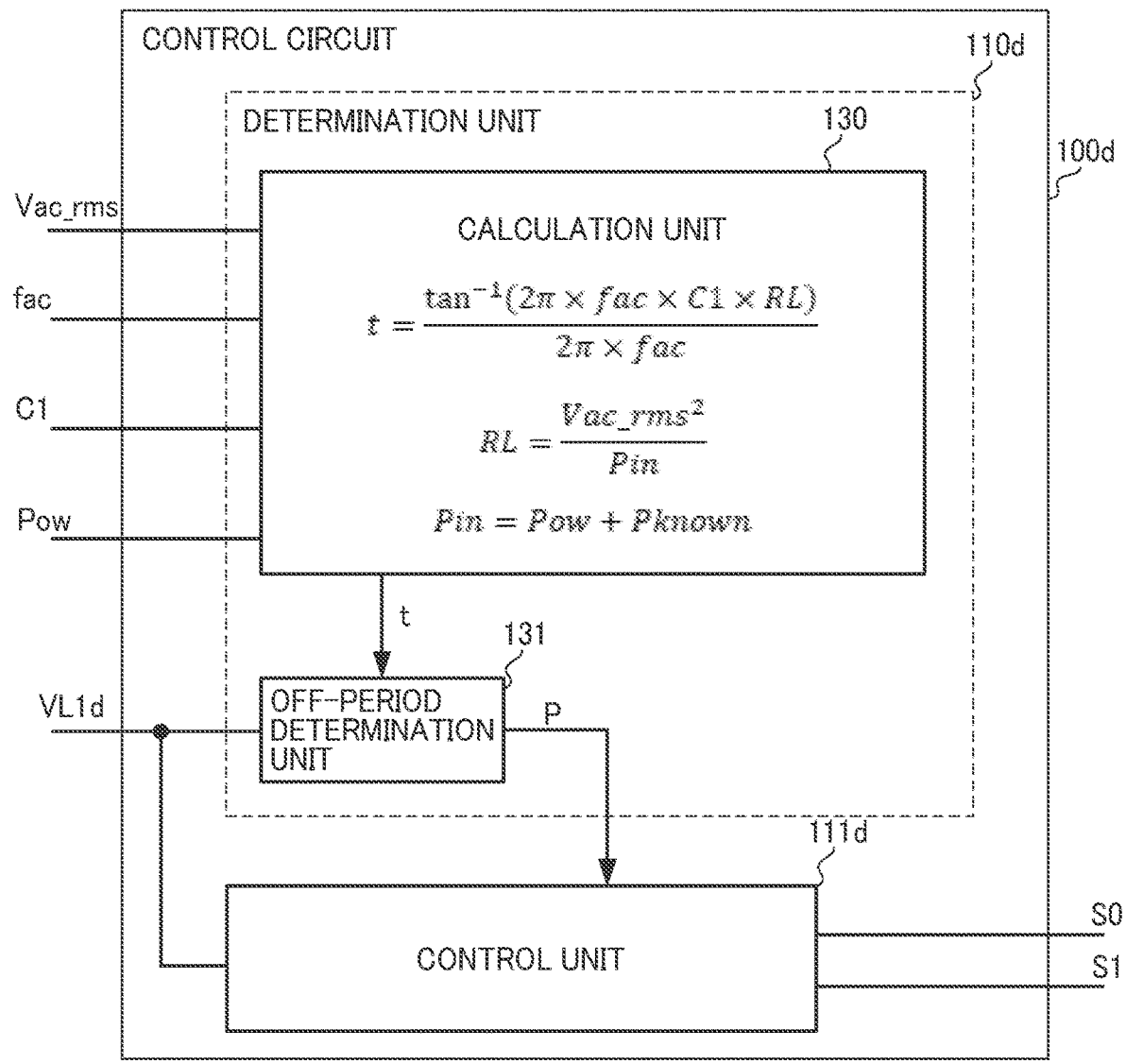
FIG. 17 is a diagram illustrating one example of a control circuit 100d.

Configuration of Control Circuit 100*d*:

FIG. 17 is a diagram illustrating one example of the control circuit 100*d*. The control circuit 100*d* outputs, based on a voltage VL1*d*, a signal S0 for turning on NMOS transistors 60 and 63 in a period PA, and a signal S1 for turning on NMOS transistors 61 and 62 in a period PB. Specifically, the control circuit 100*d* calculates a time difference t indicating a length of a period P, based on an effective value Vac_rms and a frequency fac of an AC voltage Vac, power consumption Pin of a load operating based on the AC voltage Vac, and a capacitance value C1 of a capacitor 21. The control circuit 100*d* determines the off period P, based on timing at which the AC voltage Vac is zero and the time difference t.

Then, the control circuit 100*d* turns on the NMOS transistors 60 and 63 in the period PA, and turns on the NMOS transistors 61 and 62 in the period PB.

The control circuit 100*d* includes a determination unit 110*d* and a control unit 111*d*. The determination unit 110*d* includes a calculation unit 130 and an off-period determination unit 131. The calculation unit 130 calculates the time difference t, based on the effective value Vac_rms, the frequency fac, the power consumption Pow, and the capacitance value C1. Specifically, the calculation unit 130 calculates the time difference t, based on the following equation (1). Note that the effective value Vac_rms, the frequency fac, and the capacitance value C1 are assumed to be acquired from another component in the control circuit 100*d*. The time difference t corresponds to a phase difference between the AC voltage Vac and an AC current Iac, and corresponds to a period of the periods P1 and P3 in FIGS. 4A to 4D. The time difference t corresponds to a "third period".

$$t = \tan^{-1}(2\pi \times fac \times C1 \times RL)/2\pi/fac \quad (1)$$

Here, a load RL is obtained from the following equation (2), and the power consumption Pin is power consumption acquired by adding known power consumption Pknown of a full-wave rectifier circuit 20*a* and a power factor correction circuit 22 to the power consumption Pow of the load 11. Note that the full-wave rectifier circuit 20*a*, the power factor correction circuit 22, and the load 11 correspond to a "load".

$$RL = Vac\_rms^2/Pin \quad (2)$$

The off-period determination unit 131 detects timing at which the AC voltage Vac is 0 V, based on the voltage VL1*d*, and determines the off period P, based on the timing and the time difference t. Note that the off-period determination unit 131 determines, as the off period P, a period corresponding to the time difference t before the AC voltage Vac is 0 V. The control unit 111*d* outputs, based on the off period P and the voltage VL1*d*, the signal S0 for turning on the NMOS transistors 60 and 63 in the period PA, and the signal S1 for turning on the NMOS transistors 61 and 62 in the period PB.

Figure 18:
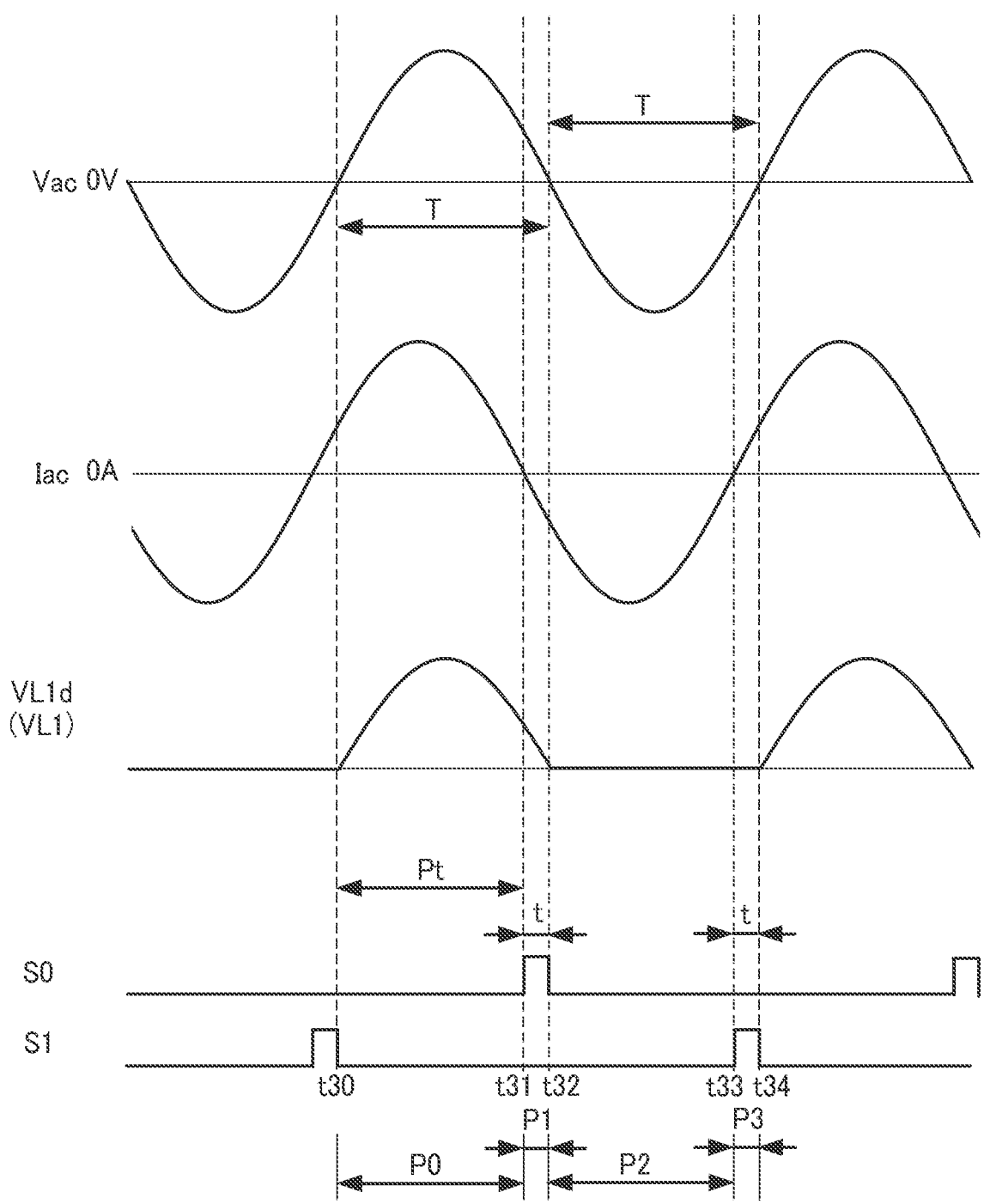
FIG. 18 is a diagram illustrating a main waveform of the control block 23d.

Operation of Full-Wave Rectifier Circuit 20*a* and Control Block 23*d*:

FIG. 18 is a diagram illustrating a main waveform of the control block 23*d*. In FIG. 18, a period from a time t30 to a time t31 is expressed as a period P0, a period from the time t31 to a time t32 is expressed as a period P1, a period from the time t32 to a time t33 is expressed as a period P2, and a period from the time t33 to a time t34 is expressed as a period P3. The calculation unit 130 is assumed to have already calculated the time difference t, based on the effective value Vac_rms, the frequency fac, the power consumption Pow, and the capacitance value C1.

Operation in Period P0:

As described in FIG. 6, a current flows through diodes 50 and 53, whereas a current does not flow through diodes 51 and 52 in the period P0 starting from the time t30. The AC voltage Vac is 0 V at the time t30, and thus the off-period determination unit 131 detects a half cycle T of the AC voltage Vac, based on timing at which the AC voltage Vac is 0 V before the time t30 and timing at the time t30. Then, the off-period determination unit 131 calculates a period Pt acquired by subtracting the time difference t from the half cycle T. Since the period Pt has not elapsed since the AC voltage Vac is 0 V in the period P0, the off-period determination unit 131 does not output a signal indicating the off period P, and the control unit 111*d* outputs the signals S0 and S1 at the "L" level.

Operation in Period P1:

As described in FIG. 7, a current does not flow through the diodes 50 to 53 in the period P1 starting from the time t31. Since the period Pt has elapsed at the time t31 since the time t30, the off-period determination unit 131 outputs the signal indicating the off period P. Then, since the voltage VL1*d* is the positive voltage, the control unit 111*d* outputs the signal S0 at the "H" level and the signal S1 at the "L" level.

Operation in Period P2:

As described in FIG. 8, a current does not flow through the diodes 50 and 53, whereas a current flows through the diodes 51 and 52 in the period P2 starting from the time t32. The AC voltage Vac is 0 V at the time t32, and thus the off-period determination unit 131 detects a half cycle T of the AC voltage Vac, based on timing at which the AC voltage Vac is 0 V before the time t32 and timing at the time t32. Then, the off-period determination unit 131 calculates a period Pt acquired by subtracting the time difference t from the half cycle T. Since the period Pt has not elapsed since the AC voltage Vac is 0 V in the period P2, the off-period determination unit 131 does not output a signal indicating the off period P, and the control unit 111*d* outputs the signals S0 and S1 at the "L" level.

Operation in Period P3:

As described in FIG. 9, a current does not flow through the diodes 50 to 53 in the period P3 starting from the time t33. Since the period Pt has elapsed at the time t33 since the time t32, the off-period determination unit 131 outputs the signal indicating the off period P. Then, since the voltage VL1*d* is substantially the ground voltage, the control unit 111*d* outputs the signal S0 at the "L" level and the signal S1 at the "H" level.

Note that a similar operation is repeated at and after the time t34.

In FIG. 16, the power factor correction IC 33 in FIG. 1 and the control circuit 100*d* are described as different circuits, but the two circuits may be formed of one integrated circuit. The integrated circuit may also include an element (i.e., the resistors 90 and 91) of the control block 23*d* except for the control circuit 100*d*.

Control Circuit Configured to Detect Start of Period P, Based on AC Current Iac:

{Configuration of AC-DC Converter 10*e* and Control Block 23*e*}

Figure 19:
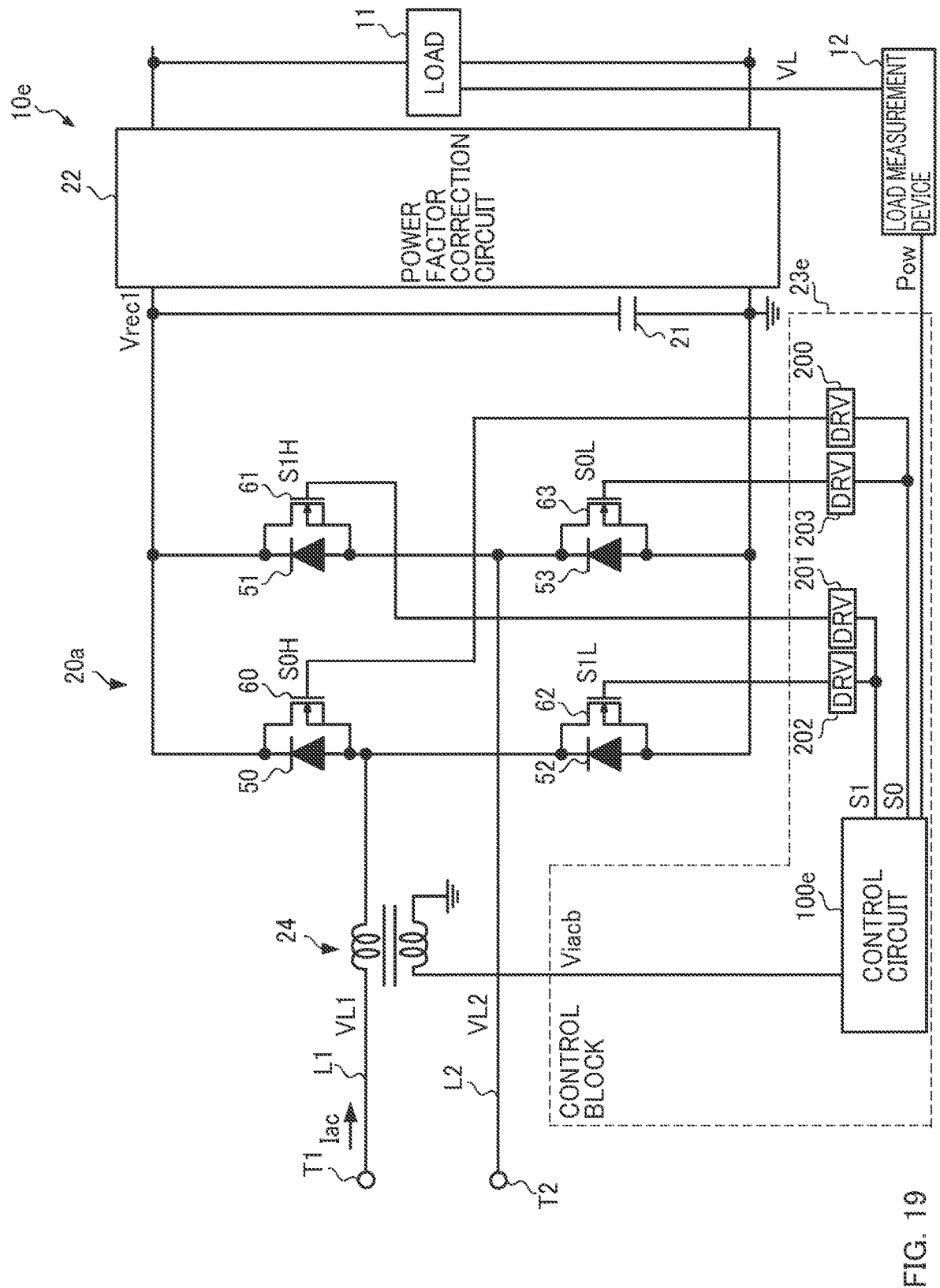
FIG. 19 is a diagram illustrating one example of an AC-DC converter 10e and a control block 23e.

FIG. 19 is a diagram illustrating one example of an AC-DC converter 10*e* and a control block 23*e*. In contrast to the AC-DC converter 10*d*, the AC-DC converter 10*e* further includes a current detection transformer 24 configured to detect a current Iac flowing through a line L1. The control block 23*e* includes a control circuit 100*e* and driver circuits 200 to 203.

Figure 20:
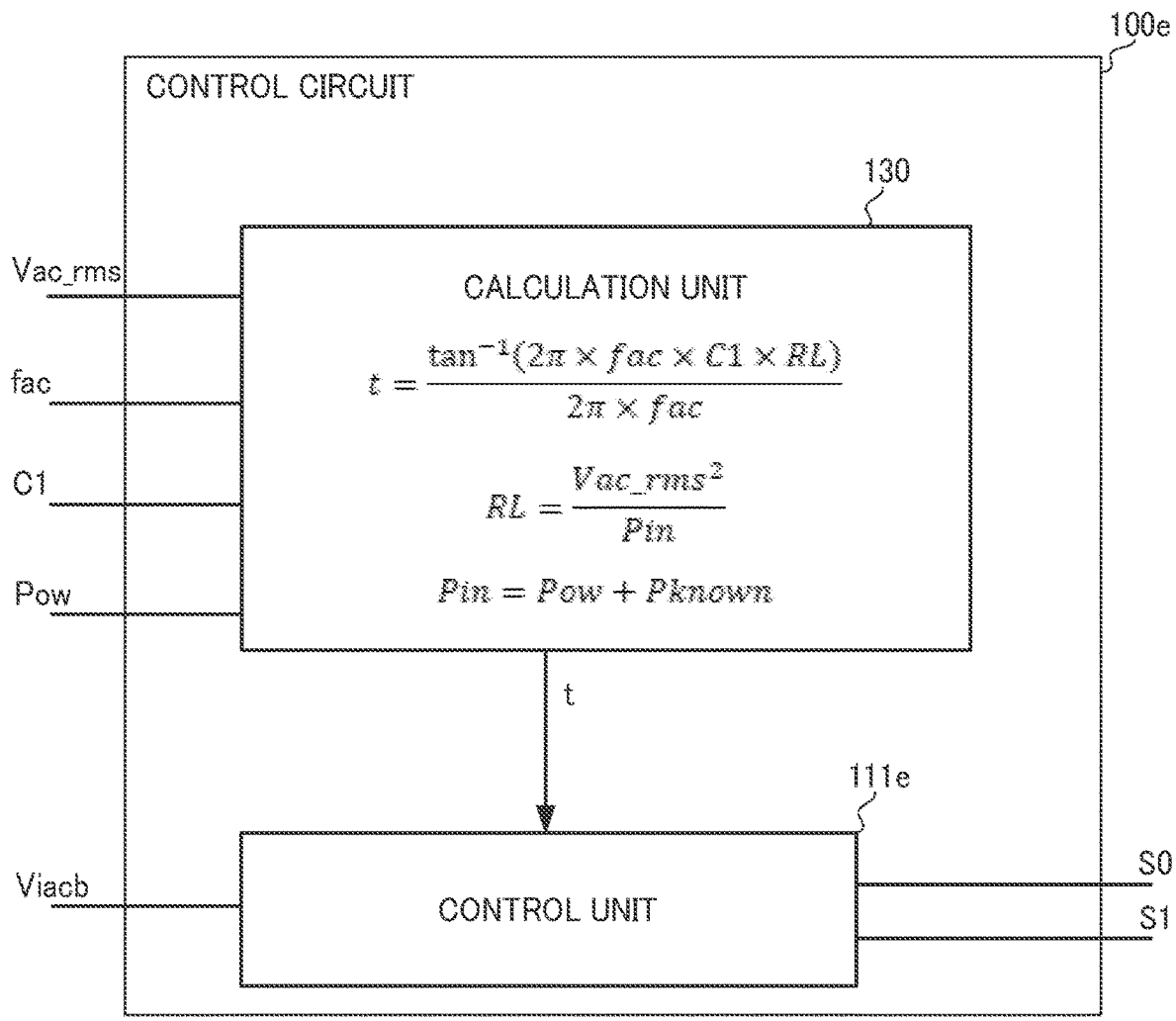
FIG. 20 is a diagram illustrating one example of a control circuit 100e.

Configuration of Control Circuit 100e:

FIG. 20 is a diagram illustrating one example of the control circuit 100e. The control circuit 100e outputs, based on a voltage Viacb from the current detection transformer 24, a signal S0 for turning on NMOS transistors 60 and 63 in a period PA, and a signal S1 for turning on NMOS transistors 61 and 62 in a period PB. Specifically, the control circuit 100e calculates a time difference t, based on an effective value Vac_rms and a frequency fac of an AC voltage Vac, power consumption Pin of a load operating based on the AC voltage Vac, and a capacitance value C1 of a capacitor 21. Then, the control circuit 100e turns on the NMOS transistors 60 and 63 in the period PA, and turns on the NMOS transistors 61 and 62 in the period PB, based on the AC current Iac.

The control circuit 100e includes a calculation unit 130 and a control unit 11e. The control unit 11e outputs, based on the voltage Viacb from the current detection transformer 24 and the time difference t, the signal S0 for turning on the NMOS transistors 60 and 63 in the period PA during the time difference t such that the AC current Iac flows from a line L2 (i.e., in the negative direction) after the AC current Iac is 0 A. Similarly, the control unit 11e outputs the signal S1 for turning on the NMOS transistors 61 and 62 in the period PB during the time difference t such that the AC current Iac flows from the line L1 (i.e., in the positive direction) after the AC current Iac is 0 A. Note that the time difference t corresponds to a "predetermined period".

Figure 21:
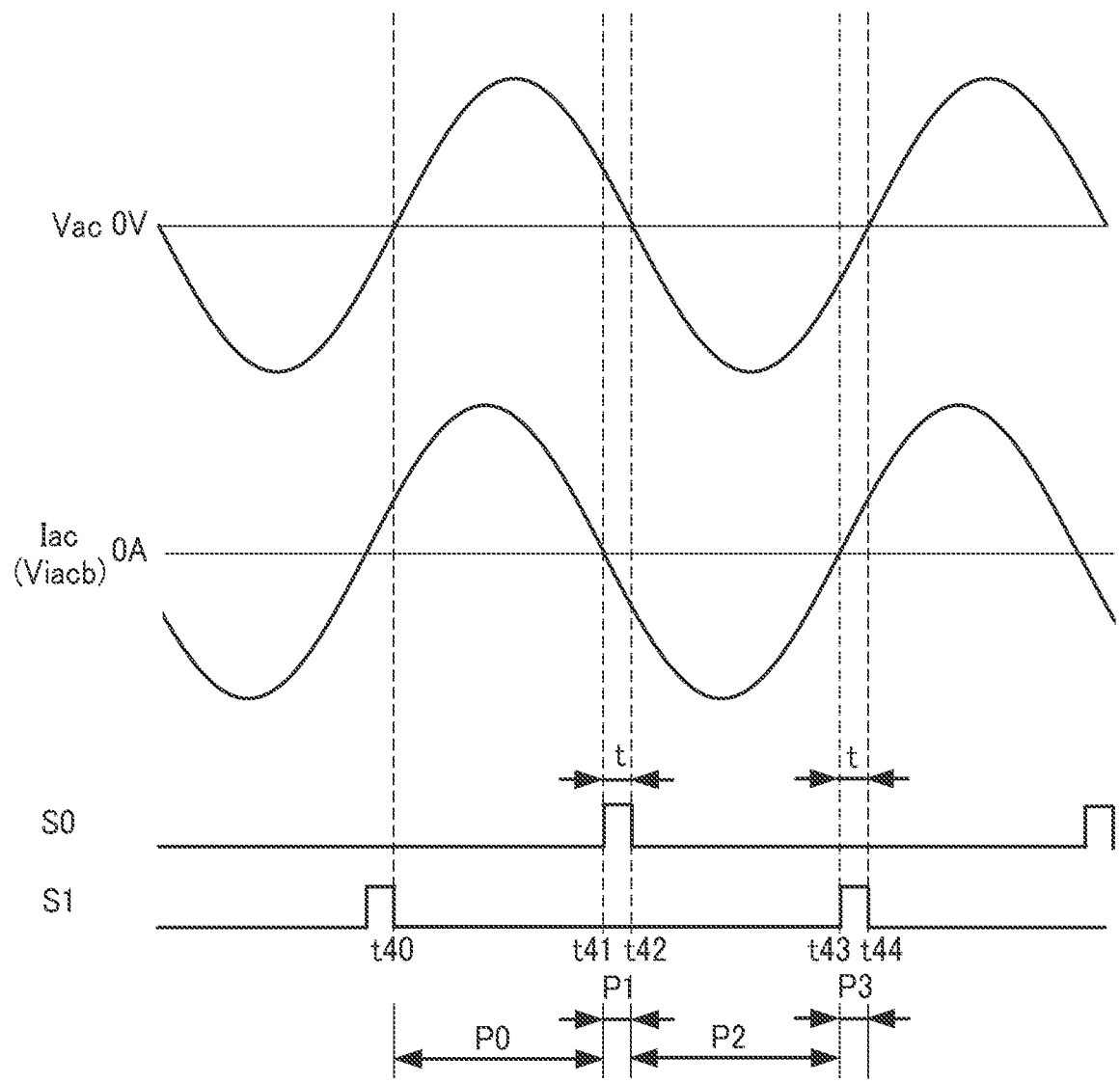
FIG. 21 is a diagram illustrating a main waveform of the control block 23e.

Operation of Full-wave Rectifier Circuit 20a and Control Block 23e:

FIG. 21 is a diagram illustrating a main waveform of the control block 23e. In FIG. 21, a period from a time t40 to a time t41 is expressed as a period P0, a period from the time t41 to a time t42 is expressed as a period P1, a period from the time t42 to a time t43 is expressed as a period P2, and a period from the time t43 to a time t44 is expressed as a period P3. The calculation unit 130 is assumed to have already calculated the time difference t, based on the effective value Vac_rms, the frequency fac, the power consumption Pow, and the capacitance value C1.

Operation in Period P0:

As described in FIG. 6, a current flows through diodes 50 and 53, whereas a current does not flow through diodes 51 and 52 in the period P0 starting from the time t40. In the period P0, the control unit 11e outputs the signals S0 and S1 at the "L" level, based on the voltage Viacb indicating that the AC current Iac is not 0 A.

Operation in Period P1:

As described in FIG. 7, a current does not flow through the diodes 50 to 53 in the period P1 starting from the time t41. At the time t41, the control unit 11e outputs the signal S0 at the "H" level and the signal S1 at the "L" level such that the AC current Iac flows in the negative direction, based on the voltage Viacb indicating that the AC current Iac is 0 A.

Operation in Period P2:

As described in FIG. 8, a current does not flow through the diodes 50 and 53, whereas a current flows through the diodes 51 and 52 in the period P2 starting from the time t42. In the period P2, the control unit 11e outputs the signals S0 and S1 at the "L" level, based on the voltage Viacb indicating that the AC current Iac is not 0 A.

Operation in Period P3:

As described in FIG. 9, a current does not flow through the diodes 50 to 53 in the period P3 starting from the time t43. At the time t43, the control unit 11e outputs the signal S0 at the "L" level and the signal S1 at the "H" level such that the AC current Iac flows in the positive direction, based on the voltage Viacb indicating that the AC current Iac is 0 A.

Note that a similar operation is repeated at and after the time t44.

In FIG. 19, the power factor correction IC 33 in FIG. 1 and the control circuit 100e are described as different circuits, but the two circuits may be formed of one integrated circuit.

Control Circuit Configured to Turn on and Off NMOS Transistors 60 to 63, Based on AC Voltage Vac and AC Current Iac:

{Configuration of AC-DC Converter 10f and Control Block 23f}

Figure 22:
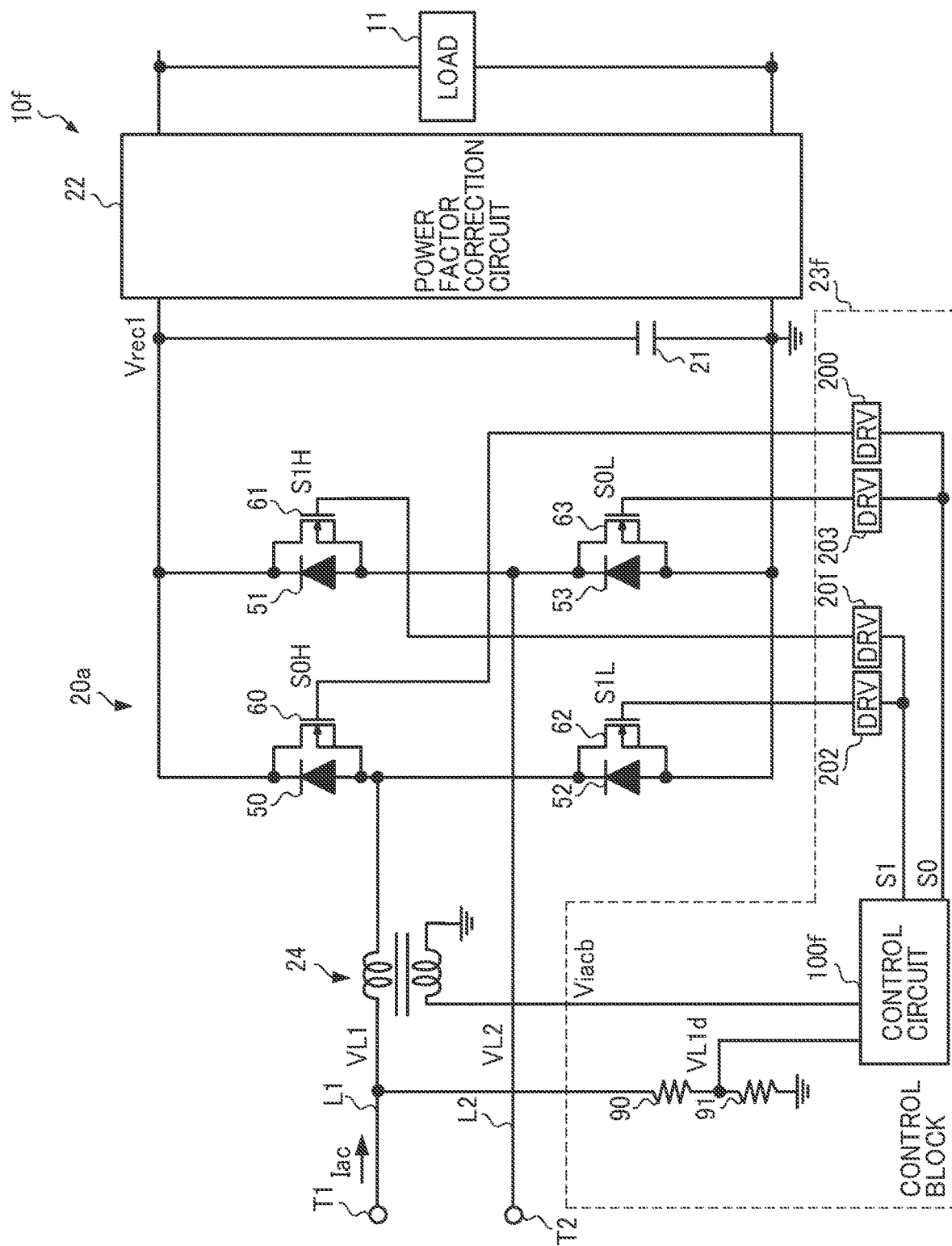
FIG. 22 is a diagram illustrating one example of an AC-DC converter 10f and a control block 23f.

FIG. 22 is a diagram illustrating one example of an AC-DC converter 10f and a control block 23f. The AC-DC converter 10f is similar to the AC-DC converter 10e except for that only a control circuit 100f in the control block 23f is different. The control block 23f includes resistors 90 to 91, the control circuit 100f, and driver circuits 200 to 203.

Figure 23:
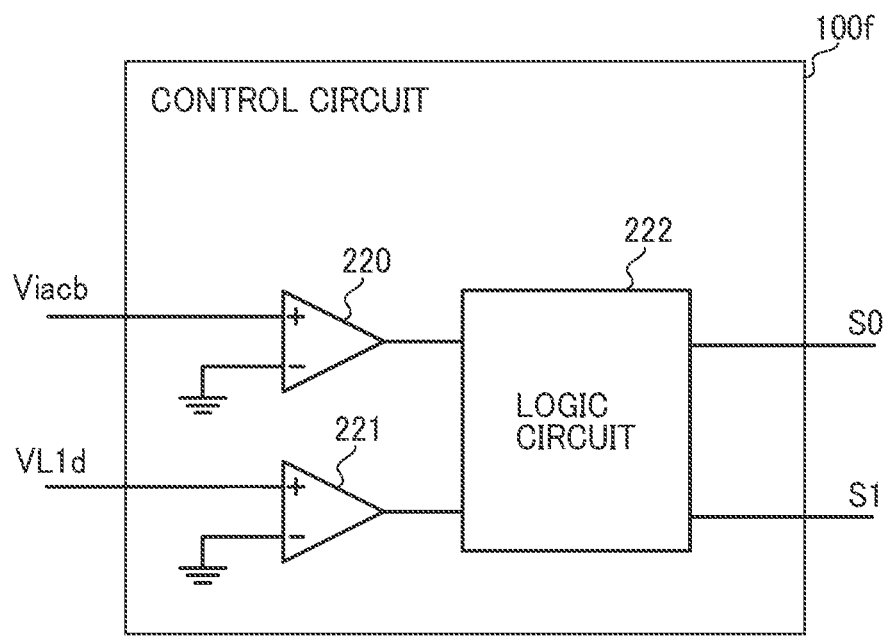
FIG. 23 is a diagram illustrating one example of a control circuit 100f.

Configuration of Control Circuit 100f:

FIG. 23 is a diagram illustrating one example of the control circuit 100f. The control circuit 100f detects an AC voltage Vac and an AC current Iac, and outputs a signal S0 for turning on and off NMOS transistors 60 and 63 and a signal S1 for turning on and off NMOS transistors 61 and 62. Specifically, when the AC current Iac flows from a line L2 to a full-wave rectifier circuit 20a (i.e., in the negative direction), and a voltage VL1 of a line L1 is higher than a voltage VL2 of the line L2, the control circuit 100f outputs the signal S0 for turning on the NMOS transistors 60 and 63. On the other hand, when the AC current Iac flows from the line L1 to the full-wave rectifier circuit 20a (i.e., in the positive direction), and the voltage VL1 of the line L1 is lower than the voltage VL2 of the line L2, the control circuit 100f outputs the signal S1 for turning on the NMOS transistors 61 and 62.

The control circuit 100f includes comparison circuits 220 and 221 and a logic circuit 222.

The comparison circuit 220 compares a voltage Viacb and the ground voltage in order to determine a direction in which the AC current Iac flows, and determine whether the voltage Viacb is the positive voltage. The comparison circuit 221 compares a voltage VL1d and the ground voltage in order to determine whether the voltage VL1 is higher than the voltage VL2, and determines whether the voltage VL1d is the positive voltage.

The logic circuit 222 outputs the signals S0 and S1, based on the comparison results of the comparison circuits 220 and 221. Specifically, when the AC current Iac flows from the line L2 to the full-wave rectifier circuit 20a (i.e., in the negative direction), and the voltage VL1 of the line L1 is higher than the voltage VL2 of the second line, the logic circuit 222 outputs the signal S0 for turning on the NMOS transistors 60 and 63. On the other hand, when the AC current Iac flows from the line L1 to the full-wave rectifier circuit 20a (i.e., in the positive direction), or the voltage VL1 of the line L1 is lower than the voltage VL2 of the second line, the logic circuit 222 outputs the signal S0 for turning off the NMOS transistors 60 and 63.

When the AC current Iac flows from the line L1 to the full-wave rectifier circuit 20a (i.e., in the positive direction), and the voltage VL1 of the line L1 is lower than the voltage VL2 of the line L2, the logic circuit 222 outputs the signal S1 for turning on the NMOS transistors 61 and 62. On the other hand, when the AC current Iac flows from the line L2 to the full-wave rectifier circuit 20a (i.e., in the negative direction), or the voltage VL1 of the line L1 is higher than the voltage VL2 of the line L2, the logic circuit 222 outputs the signal S1 for turning off the NMOS transistors 61 and 62. Note that the comparison circuit 220 corresponds to a "first determination circuit", and the comparison circuit 221 corresponds to a "second determination circuit". A circuit including the driver circuits 200 to 203 in the logic circuit 222 corresponds to an "on circuit".

Figure 24:
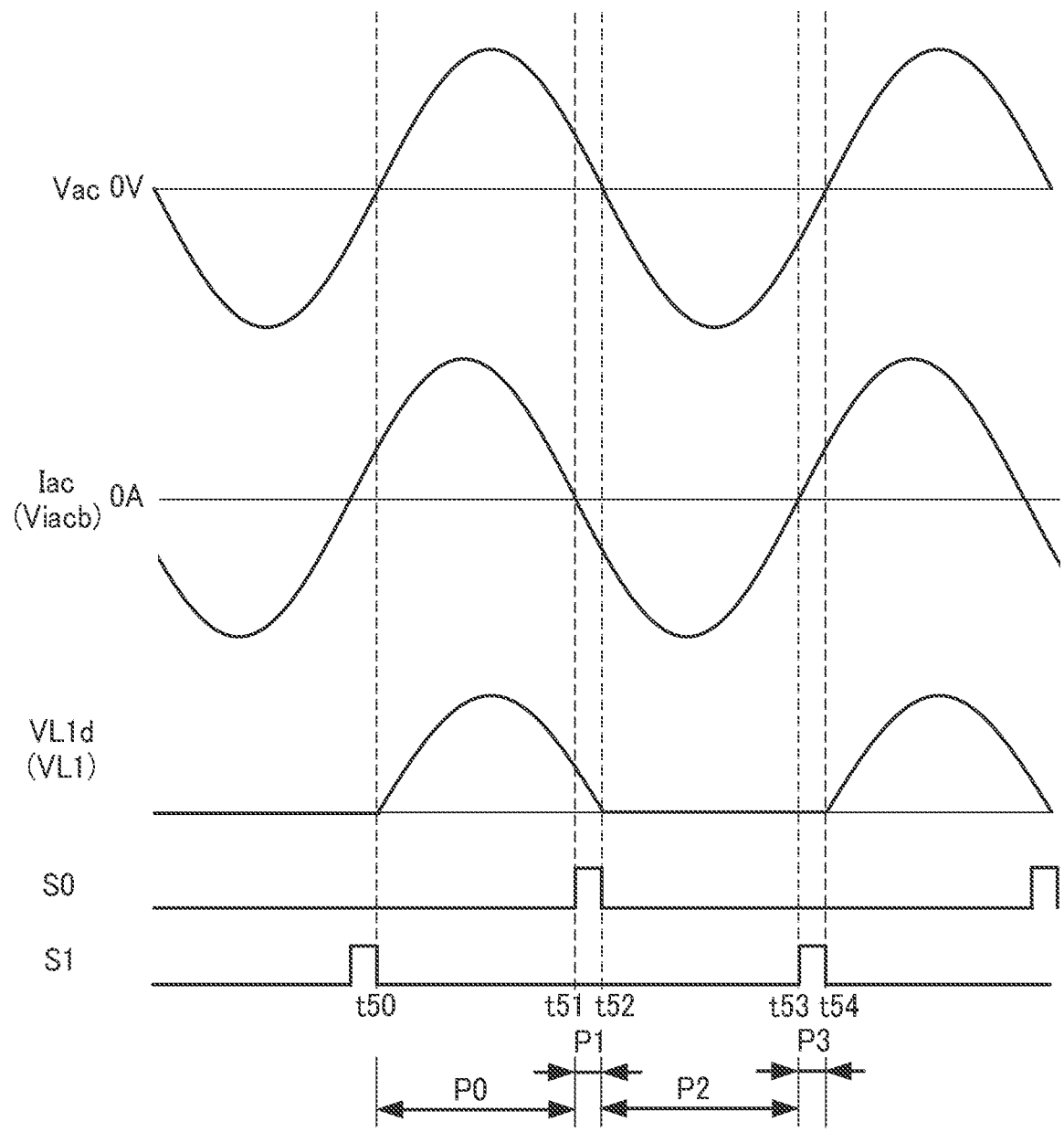
FIG. 24 is a diagram illustrating a main waveform of the control block 23f.

Operation of Full-Wave Rectifier Circuit 20a and Control Block 23f:

FIG. 24 is a diagram illustrating a main waveform of the control block 23f. In FIG. 24, a period from a time t50 to a time t51 is expressed as a period P0, a period from the time t51 to a time t52 is expressed as a period P1, a period from the time t52 to a time t53 is expressed as a period P2, and a period from the time t53 to a time t54 is expressed as a period P3.

Operation in Period P0:

As described in FIG. 6, a current flows through diodes 50 and 53, whereas a current does not flow through diodes 51 and 52 in the period P0 starting from the time t50. In the period P0, the comparison circuit 220 detects that the AC current Iac flows in the positive direction, and the comparison circuit 221 detects that the voltage VL1 of the line L1 is higher than the voltage VL2 of the line L2. Thus, the logic circuit 222 outputs the signals S0 and S1 at the "L" level for turning off the NMOS transistors 60 to 63.

Operation in Period P1:

As described in FIG. 7, a current does not flow through the diodes 50 to 53 in the period P1 starting from the time t51. In the period P1, the comparison circuit 220 detects that the AC current Iac flows in the negative direction, and the comparison circuit 221 detects that the voltage VL1 of the line L1 is higher than the voltage VL2 of the line L2. Thus, the logic circuit 222 outputs the signal S0 at the "H" level for turning on the NMOS transistors 60 and 63, and the signal S1 at the "L" level for turning off the NMOS transistors 61 and 62.

Operation in Period P2:

As described in FIG. 8, a current does not flow through the diodes 50 and 53, whereas a current flows through the diodes 51 and 52 in the period P2 starting from the time t52. In the period P2, the comparison circuit 220 detects that the AC current Iac flows in the negative direction, and the comparison circuit 221 detects that the voltage VL1 of the line L1 is lower than the voltage VL2 of the line L2. Thus, the logic circuit 222 outputs the signals S0 and S1 at the "L" level for turning off the NMOS transistors 60 to 63.

Operation in Period P3:

As described in FIG. 9, a current does not flow through the diodes 50 to 53 in the period P3 starting from the time t53. In the period P3, the comparison circuit 220 detects that the AC current Iac flows in the positive direction, and the comparison circuit 221 detects that the voltage VL1 of the line L1 is lower than the voltage VL2 of the line L2. Thus, the logic circuit 222 outputs the signal S0 at the "L" level for turning off the NMOS transistors 60 and 63, and the signal S1 at the "H" level for turning on the NMOS transistors 61 and 62.

Note that a similar operation is repeated at and after the time t54.

In FIG. 22, the power factor correction IC 33 in FIG. 1 and the control circuit 100f are described as different circuits, but the two circuits may be formed of one integrated circuit. The integrated circuit may also include an element (i.e., the resistors 90 and 91) of the control block 23f except for the control circuit 100f.

SUMMARY

The AC-DC converter 10a according to the present embodiment is described above. The control circuit 100a includes the determination unit 110a and the control unit 111a. The determination unit 110a determines the off period P, and the control unit 111a turns on the NMOS transistors 60 and 63 in the period PA, and turns on the NMOS transistors 61 and 62 in the period PB. In this way, a control circuit that can suppress distortion of an AC current in a full-wave rectifier circuit can be provided.

The determination unit 110a determines the off period P, based on the AC voltage Vac and a voltage of the capacitor 21. In this way, a voltage in a circuit can be measured, and the off period P can be determined.

The determination unit 110a determines the off period P, based on the voltage Vrec1d and the voltage Vrec2d. In this way, a circuit of the determination unit 110a can be made simple.

The determination units 110b and 110c determine the off period P, based on a current flowing through the diodes 52 and 53. In this way, the off period P can be determined without using the diodes 70 and 71 and the resistors 72, 73, 80, and 81.

The control unit 111a includes the comparison circuits 121 and 122 and the AND circuits 123 and 124. In this way, a simple circuit can identify whether the off period P is the period PA or the period PB, and can turn on an appropriate NMOS transistor among the NMOS transistors 60 to 63.

The determination unit 110d includes the calculation unit 130 and the off-period determination unit 131.

The calculation unit 130 calculates the time difference t, and the off-period determination unit 131 determines the off period P, based on the time difference t and the voltage VL1 of the line L1. In this way, by using a microcomputer, the off period P can be determined based on the voltage VL1.

The control circuit 100e includes the calculation unit 130 and the control unit 111e. Based on the time difference t and the AC current Iac, the control unit 111e turns on the NMOS transistors 60 and 63 in the period PA corresponding to the time difference t after the AC current Iac is 0 A, and turns on the NMOS transistors 61 and 62 in the period PB corresponding to the time difference t after the AC current Iac is 0 A. In this way, by using a microcomputer, the NMOS transistors 60 to 63 can turn on based on the AC current Iac.

The control circuit 100f outputs the signal S0 for turning on and off the NMOS transistors 60 and 63 and the signal S1 for turning on and off the NMOS transistors 61 and 62, based on a direction of the AC current Iac and a level of the AC voltage Vac. In this way, the control circuit 100f needs the current detection transformer 24 configured to detect the AC current Iac, but can output the signals S0 and S1 without using a microcomputer for a computation.

The present invention has been made in view of a problem in the related art as described above, and has an object to provide a control circuit that can suppress distortion of an AC current in a full-wave rectifier circuit.

The present invention can provide a control circuit that can suppress distortion of an AC current in a full-wave rectifier circuit.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. A control circuit for a circuit that includes:
a first line and a second line having an alternating current (AC) voltage applied thereto;
a first full-wave rectifier circuit including:
a first diode configured to cause a first current to flow from the first line,
a second diode configured to cause a second current to flow from the second line,
a third diode configured to cause a third current to flow to the first line,
a fourth diode configured to cause a fourth current to flow to the second line, and
a first switch to a fourth switch respectively connected in parallel with the first diode to the fourth diode, and being configured to rectify the AC voltage, to thereby obtain a first rectified voltage; and
a capacitor to which the first rectified voltage is applied,
the control circuit being configured to control the first to fourth switches, and comprising:
a determination unit configured to determine an off period in which, in a state where the AC voltage is applied to the first line and the second line, the first diode, the second diode, the third diode, and the fourth diode turn off, the off period including
a first period in which the first diode and the fourth diode turn off when the second diode and the third diode are off, and
a second period in which the second diode and the third diode turn off when the first diode and the fourth diode are off; and
a control unit configured to
turn on the first switch and the fourth switch in the first period,
turn on the second switch and the third switch in the second period.

2. The control circuit according to claim 1, wherein the determination unit determines the off period based on the AC voltage and a voltage of the capacitor.

3. The control circuit according to claim 2, wherein the circuit further includes
a second full-wave rectifier circuit configured to perform full-wave rectification on the AC voltage, to thereby obtain a second rectified voltage,
a first voltage divider circuit configured to divide the second rectified voltage from the second full-wave rectifier circuit, and
a second voltage divider circuit configured to divide the voltage of the capacitor, and
the determination unit determines the off period based on
a first divided voltage of the first voltage divider circuit and a second divided voltage of the second voltage divider circuit.

4. The control circuit according to claim 1, wherein the circuit further includes a resistor configured to detect a current flowing through the third diode or the fourth diode, and
the determination unit determines the off period based on the current flowing through the third diode or the fourth diode.

5. The control circuit according to claim 1, wherein the control unit includes
a first detection circuit configured to detect whether a voltage of the first line is higher than a voltage of the second line,
a second detection circuit configured to detect whether the voltage of the second line is higher than the voltage of the first line, and
a switch control circuit configured to
turn on the first switch and the fourth switch in the off period when the voltage of the first line is higher than the voltage of the second line, and
turn on the second switch and the third switch in the off period when the voltage of the first line is lower than the voltage of the second line.

6. The control circuit according to claim 1, wherein
the circuit drives a load that operates based on the AC voltage; and
the determination unit includes
a calculation unit configured to calculate a third period, based on an effective value of the AC voltage, a frequency of the AC voltage, power consumption of the load operating based on the AC voltage, and a capacitance value of the capacitor, and
an off-period determination unit configured to determine the off period, based on a timing at which the AC voltage is zero and the third period.

7. A control circuit for a circuit that includes:
a first line and a second line having an alternating current (AC) voltage applied thereto;
a first full-wave rectifier circuit, including:
a first diode configured to cause a first current to flow from the first line,
a second diode configured to cause a second current to flow from the second line,
a third diode configured to cause a third current to flow to the first line,
a fourth diode configured to cause a fourth current to flow to the second line, and
a first switch to a fourth switch respectively connected in parallel with the first diode to the fourth diode, and being configured to rectify the AC voltage, to thereby obtain a first rectified voltage; and
a capacitor to which the first rectified voltage is applied,
the circuit having a load that operates based on the AC voltage, the control circuit being configured to control the first to fourth switches, and comprising:
a calculation unit configured to calculate, based on an effective value of the AC voltage, a frequency of the AC voltage, power consumption of the load operating based on the AC voltage, and a capacitance value of the capacitor, a predetermined period in which, in a state where the AC voltage is applied to the first line and the second line, the first diode, the second diode, the third diode, and the fourth diode turn off, the predetermined period including
a first period in which the first diode and the fourth diode turn off when the second diode and the third diode are off, and
a second period in which the second diode and the third diode turn off when the first diode and the fourth diode are off; and
a control unit configured to
turn on the first switch and the fourth switch in the first period of the predetermined period after a current flowing through the first line and the second line is zero, and
turn on the second switch and the third switch in the second period of the predetermined period after the current flowing through the first line and the second line is zero.

8. A circuit, comprising:
a first line and a second line having an alternating current (AC) voltage applied thereto;
a first full-wave rectifier circuit, including:
- a first diode configured to cause a first current to flow from the first line,
- a second diode configured to cause a second current to flow from the second line,
- a third diode configured to cause a third current to flow to the first line,
- a fourth diode configured to cause a fourth current to flow to the second line, and
- a first switch to a fourth switch respectively connected in parallel with the first diode to the fourth diode, and being configured to rectify the AC voltage, to thereby obtain a first rectified voltage;

a capacitor to which the first rectified voltage is applied; and
a control circuit configured to control the first switch to the fourth switch, wherein
the control circuit includes
- a determination unit configured to determine an off period in which, in a state where the AC voltage is applied to the first line and the second line, the first diode, the second diode, the third diode, and the fourth diode turn off, the off period including
  - a first period in which the first diode and the fourth diode turn off when the second diode and the third diode are off, and
  - a second period in which the second diode and the third diode turn off when the first diode and the fourth diode are off; and
- a control unit configured to
  - turn on the first switch and the fourth switch in the first period, and
  - turn on the second switch and the third switch in the second period.

9. A control circuit for a circuit that includes:
a first line and a second line having an alternating current (AC) voltage applied thereto;
a first full-wave rectifier circuit including:
- a first diode configured to cause a first current to flow from the first line,
- a second diode configured to cause a second current to flow from the second line,
- a third diode configured to cause a third current to flow to the first line,
- a fourth diode configured to cause a fourth current to flow to the second line, and
- a first switch to a fourth switch respectively connected in parallel with the first diode to the fourth diode, and being configured to rectify the AC voltage, to thereby obtain a first rectified voltage; and a capacitor to which the first rectified voltage is applied, the control circuit being configured to control the first to fourth switches, and comprising:
- a first determination circuit configured to determine a direction in which a current flows through the first line;
- a second determination circuit configured to determine whether a voltage of the first line is higher than a voltage of the second line; and
- an on circuit configured to
  - turn on the first switch and the fourth switch when the current flows from the second line to the first full-wave rectifier circuit and the voltage of the first line is higher than the voltage of the second line, and
  - turn on the second switch and the third switch when the current flows from the first line to the first full-wave rectifier circuit and the voltage of the first line is lower than the voltage of the second line.

10. A circuit comprising:
a first line and a second line having an alternating current (AC) voltage applied thereto;
a first full-wave rectifier circuit, including:
- a first diode configured to cause a first current to flow from the first line,
- a second diode configured to cause a second current to flow from the second line,
- a third diode configured to cause a third current to flow to the first line,
- a fourth diode configured to cause a fourth current to flow to the second line, and
- a first switch to a fourth switch respectively connected in parallel with the first diode to the fourth diode, and being configured to rectify the AC voltage, to thereby obtain a first rectified voltage;

a capacitor to which the first rectified voltage is applied; and
a control circuit configured to control the first switch to the fourth switch, wherein
the control circuit includes
- a first determination circuit configured to determine a direction in which a current flows through the first line,
- a second determination circuit configured to determine whether a voltage of the first line is higher than a voltage of the second line, and
- an on circuit configured to
  - turn on the first switch and the fourth switch when the current flows from the second line to the first full-wave rectifier circuit and the voltage of the first line is higher than the voltage of the second line, and
  - turn on the second switch and the third switch when the current flows from the first line to the first full-wave rectifier circuit and the voltage of the first line is lower than the voltage of the second line.

* * * * *